United States Patent [19]
Hanakawa et al.

[11] Patent Number: 5,936,935
[45] Date of Patent: Aug. 10, 1999

[54] DISK CARTRIDGE HAVING A LOCKING MEANS AND CARTRIDGE COUPLING MEANS

[75] Inventors: Eiichi Hanakawa, Kyoto; Akira Kurozuka, Yao; Hiroyuki Takeuchi, Hirakata; Hironori Okazawa, Neyagawa; Yoshikazu Goto, Hirakata, all of Japan

[73] Assignee: Matsushita Electric Industrial Co., Ltd., Kadoma, Japan

[21] Appl. No.: 08/501,395

[22] Filed: Jul. 12, 1995

[30] Foreign Application Priority Data

Jul. 14, 1994 [JP] Japan .................................... 6-162032
Feb. 15, 1995 [JP] Japan .................................... 7-027077

[51] Int. Cl.$^6$ .......................... G11B 23/03; B65D 21/032
[52] U.S. Cl. ...................... 369/291; 206/308.1; 206/506; 206/509; 312/9.58; 403/376
[58] Field of Search ............................ 360/97.01, 97.04, 360/98.01, 98.02, 99.01, 131–133; 369/178, 77.2, 192, 291, 191; 206/308.3, 309, 506, 509, 512, 308.1; 312/9.47, 9.48, 9.56, 9.58; 403/375–376, 380

[56] References Cited

U.S. PATENT DOCUMENTS

| | | | |
|---|---|---|---|
| 4,481,617 | 11/1984 | Mabry | 369/77.2 |
| 5,056,073 | 10/1991 | Fitzgerald et al. | 369/36 |
| 5,062,093 | 10/1991 | Christie et al. | 369/36 |
| 5,140,489 | 8/1992 | Barnard | 360/133 |
| 5,186,345 | 2/1993 | Ching An | 220/23.4 |
| 5,325,966 | 7/1994 | Chang | 206/372 |
| 5,360,107 | 11/1994 | Chasin et al. | 206/313 |
| 5,524,002 | 6/1996 | Morita et al. | 369/191 |
| 5,539,599 | 7/1996 | Wilder | 360/133 |
| 5,548,571 | 8/1996 | Mistretta | 369/77.2 |
| 5,548,577 | 8/1996 | Miyazaki et al. | 369/291 |

FOREIGN PATENT DOCUMENTS 5965978   4/1984   Japan .

OTHER PUBLICATIONS

Intl. Standard, ISO/IEC 10090:1992(E).

*Primary Examiner*—George J. Letscher
*Attorney, Agent, or Firm*—Renner, Otto, Boisselle & Sklar, P.L.L.

[57] ABSTRACT

A disk cartridge which includes an inner case for holding an optical disk, and an outer case for accommodating the inner case which has an opening for allowing the inner case to come in and out. The disk cartridge also includes lock means for locking the inner case in the outer case, provided in a vicinity of the opening; and coupling means for coupling the disk cartridge with another disk cartridge. A disk cartridge using the disk cartridge includes a mechanism for pulling out the inner case from the outer case by more than a half of the inner case but not by entirety thereof. The disk drive further includes a mechanism for holding the inner case at a position of being pulled out and rotating the optical disk. A disk changer apparatus includes a disk stacker for containing a plurality of the disk cartridges; the disk drive; and a mechanism for moving the disk drive device to a selected cartridge among the plurality of the disk cartridges.

24 Claims, 32 Drawing Sheets

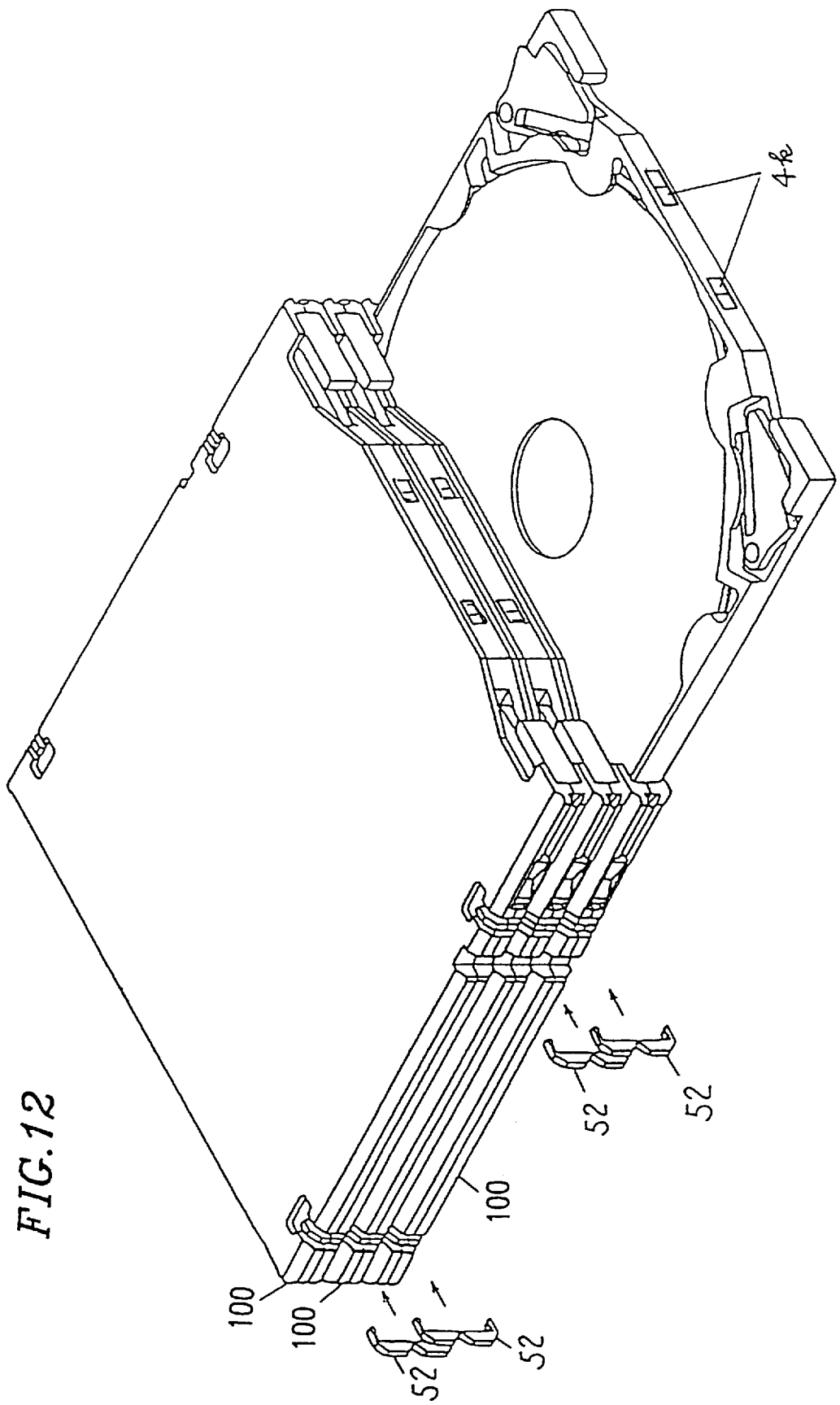

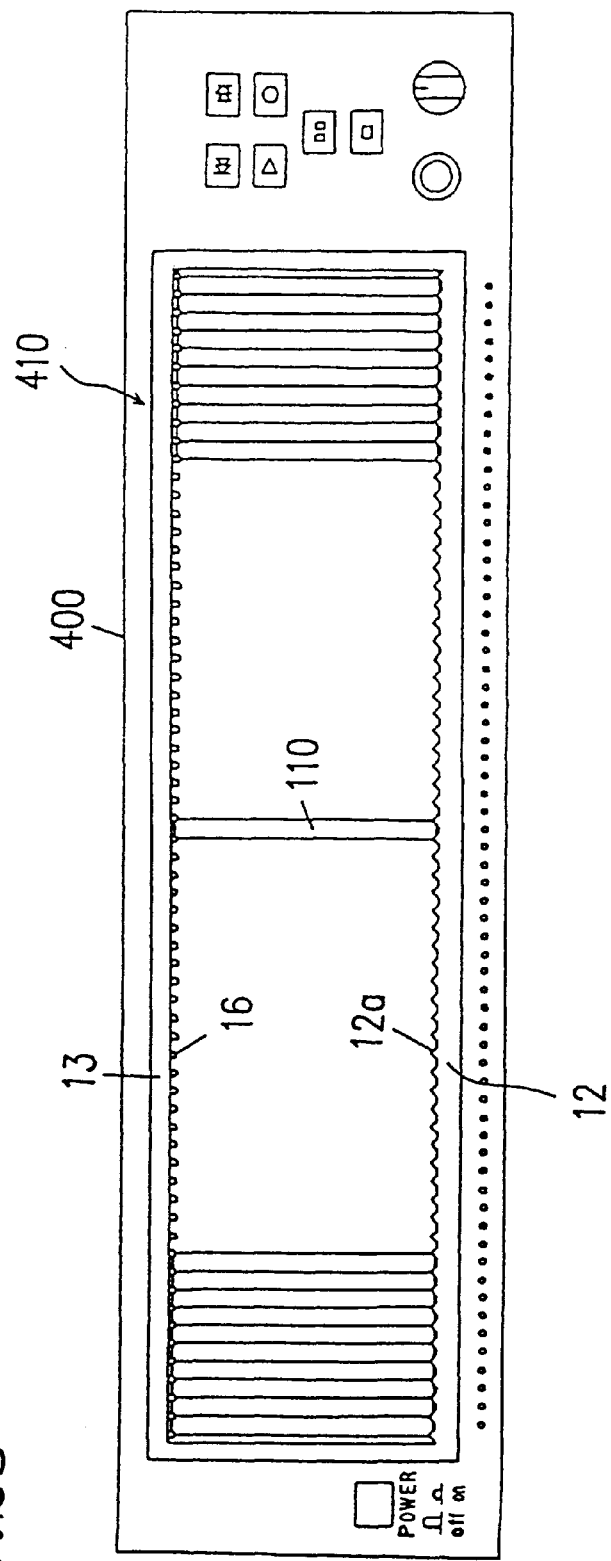

DISK CARTRIDGE HAVING A LOCKING MEANS AND CARTRIDGE COUPLING MEANS

BACKGROUND OF THE INVENTION

1. Field of the Invention

The present invention relates to an optical disk storage and handling system and, more particularly, to an optical disk cartridge, an optical disk drive and driving method using the optical disk cartridge, and an optical disk changer and method for handling a plurality of optical disk cartridges.

2. Description of the Related Art

Optical disks have been popular in recent years as a data storage medium for recording and reproducing music and audio-video works. Due to the random accessibility of optical disks, the optical disks have become popular for storing computer readable information. Recent developments resulting in increasing storage density of the optical disks have given rises to requirements that disk cartridges protect optical disks therein from dust and dirt which may cause errors.

In order to handle a large amount of information such as image data, an optical disk storage and handling system requires a very large storage capacity and must be capable of handling a large number of optical disks. Furthermore, as audio-video equipment and personal computers have been miniaturized and become portable, it has become necessary to reduce the size of the optical disk storage and handling system having a large storage capacity.

Conventional optical disk cartridges are standardized, for example, as described in ISO/IEC-10090 (Information technology—90 mm optical disk cartridges, read only and rewritable, for data interchange). Known disk drives used for handling conventional disk cartridges are described in U.S. Pat. Nos. 5,056,073 and 5,062,093.

In general, a conventional disk cartridge includes a case consisting of an upper half and a lower half and a slidable shutter. An optical disk is housed within a case in a space between the upper and lower halves. The case has an opening for inserting an optical pickup and the slidable shutter is provided to cover the opening when the disk cartridge is not in use. The shutter protects the optical disk from dust and dirt by preventing dust from getting into the case and by protecting the optical disk surface from fingerprints of an operator, for example.

The disk cartridge has a write-protect mechanism including a hole of the disk cartridge and a sliding lever provided in the hole. The hole can be opened or closed depending on a position of the lever. Whether the disk cartridge is write-protected or not is determined by detecting whether the hole is opened or closed using a write-protect detecting mechanism.

Next, a disk loading mechanism of a conventional disk drive using such disk cartridges will be described. A disk cartridge is inserted into a cartridge holder through a slotted opening provided in the front face of the disk drive. During insertion, the disk cartridge shutter is slid open by a link mechanism incorporated in the cartridge holder, so that a read/write portion of the optical disk is exposed through the opening.

The disk cartridge moves inward together with the cartridge holder while being further inserted into the disk drive. The cartridge holder moves inward by a horizontal distance S and downward by a vertical distance D to a read/write position via a guiding mechanism including a guide roller, a guide groove and the like.

The disk cartridge moves downward with the cartridge holder and is ultimately fixed at a correct position for read/write operation by a positioning pin. The optical disk within the disk cartridge is placed on a turntable provided on a spindle motor and is chucked. Thus, loading of the optical disk is completed so as to keep the optical disk in an appropriate position for read/write operation with respect to the optical pickup.

When the disk cartridge is to be pulled out from the disk drive, the cartridge holder is moved upward by a loading motor which pulls a slider against a slider spring, whereby the optical disk is taken from the turntable. By reversing the loading procedures, the disk cartridge is returned to a position to be pulled out by an operator.

Nevertheless, the conventional disk cartridge and the loading mechanism of the conventional disk drive have the following problems:

The movement of the disk cartridge downward to the spindle motor after insertion in the horizontal direction results in an aperture in an upper portion of the slotted opening of the disk drive. Dust easily enters the disk drive through the aperture. The conventional loading mechanism opens the shutter automatically when the disk cartridge is inserted in the disk drive. Accordingly, when the disk cartridge remains in the disk drive, the optical disk is exposed to dust which may cause errors.

Furthermore, a conventional disk changer apparatus includes a disk stacker which houses a plurality of disk cartridges and a disk handling mechanism. The disk handling mechanism is, typically, formed in an arm-shape and picks up one of the disk cartridges from the disk stacker and then inserts it into a disk drive device which is fixed at a predetermined position in the disk changer apparatus. The size of the disk changer apparatus has to be large due to the disk handling mechanism which moves a selected disk cartridge from the disk stacker to the disk driving device. In addition, since the arm-shape handling mechanism is provided on a disk inserting side of the stacker, the handling mechanism is an obstacle to insertion of the disk cartridges into the stacker. In addition, it is difficult to change disk cartridges rapidly because each disk cartridge has to be transferred a relatively long distance between the disk stacker and the disk drive device to access the optical disk.

SUMMARY OF THE INVENTION

A disk cartridge according to the present invention comprises: an inner case for holding an optical disk; an outer case for accommodating the inner case, having an opening for allowing the inner case to come in and out; lock means for locking the inner case in the outer case, provided in a vicinity of the opening; and coupling mechanism for coupling the disk cartridge with another disk cartridge.

In one embodiment of the present invention, the outer case is formed into a substantially rectangular box configuration having an upper face, a lower face, and four side faces, the opening being provided in one of the side face, and the outer case has a bevel on each side perpendicular to the side face having the opening.

In another embodiment of the present invention, a plurality of the disk cartridges are coupled together by using the coupling mechanism so that the openings are aligned in one plain, whereby a concave portion is formed between adjacent disk cartridges by the bevels of the adjacent disk cartridges.

In another embodiment of the present invention, the coupling mechanism includes a coupling structure provided on the outer case for receiving a coupling member for engaging with at least two disk cartridges.

In another embodiment of the present invention, the lock mechanism includes a lock mechanism and a release mechanism, the lock mechanism comprising a lock cam provided in each corner portion of a pull-out side of the inner case, for engaging with the outer case at a locked position, and the release mechanism comprising a release lever provided on each side face of the outer case in a vicinity of the opening, for operating on the lock cam and for moving the lock cam to a released position where the lock cam is released from the outer case.

A method for using the disk cartridge according to the present invention comprising the steps of: pulling out the inner case from the outer case by more than a half of the inner case but not by entirety thereof; and holding the inner case at a position of being pulled out for reading/writing data on the optical disk.

In one embodiment of the present invention, the method comprises the steps of: a first release step for releasing the lock mechanism by using a first release mechanism; and a second release step for releasing the lock mechanism by using a second release mechanism.

In another embodiment of the present invention, the first release step comprises the steps of: operating the release lever provided in one side face of the outer case on the lock cam of one corner corresponding to the one side face; and moving the lock cam from the locked position to a released position where the lock cam is accommodated within the inner case.

In another embodiment of the present invention, the second release step comprises the steps of: inserting a release pin into the U-shape cutout of one corner of the inner case; pushing the lock cam with the release portion; and moving the lock cam from the locked position to the released position.

In another embodiment of the present invention, the first release step includes the steps of: inserting a guide piece along the groove in the pull-out direction; and forcing the release lever by the guide piece to operate on the lock cam.

A disk drive using a disk cartridge according to the present invention comprising: a mechanism for pulling out the inner case from the outer case by more than a half of the inner case but not by entirety thereof; a mechanism for holding the inner case at a position of being pulled out and rotating the optical disk; and a mechanism for reading/writing data on the optical disk.

In one embodiment of the present invention, the lock mechanism includes a lock mechanism and at least two release mechanisms, and the disk drive comprises: a first release device for releasing the lock mechanism by using a first release mechanism; and a second release device for releasing the lock mechanism by using a second release mechanism.

In another embodiment of the present invention, the first release device comprises: a member for operating the release lever provided in one side face of the outer case on the lock cam of one corner corresponding to the one side face, whereby the lock cam is moved from the locked position to a released position where the lock cam is accommodated within the inner case.

In another embodiment of the present invention, the second release device comprises: a release pin for inserting into the U-shape cutout of one corner of the inner case, and for pushing the lock with the release portion, whereby the lock cam is moved from the locked position to the released position.

In another embodiment of the present invention, the first release device includes a guide piece for inserting along the groove in the pull-out direction in order to force the release lever to operate on the lock cam.

A disk changer apparatus using a plurality of disk cartridges according to the present invention comprising: a disk stacker for containing a plurality of the disk cartridges; a disk drive device for driving the optical disk; and a mechanism for moving the disk drive device to a selected disk cartridge among the plurality of the disk cartridges, wherein the disk drive includes: a mechanism for pulling out the inner case from the outer case of the selected disk cartridge by more than a half of the inner case but not by entirety thereof; a mechanism for holding the inner case at a position of being pulled out and rotating the optical disk; and a mechanism for reading/writing data on the optical disk.

In one embodiment of the present invention, the disk stacker comprises a plurality of convex portions for engaging the concave portions of the disk cartridges formed by the bevels thereof.

In another embodiment of the present invention, the stacker includes a plurality of ridges on one inside face for engaging the concave portions formed by the bevels, and a plurality of elastic convex members on another inside face for engaging the concave portions formed by the bevels.

In another embodiment of the present invention, wherein the stacker contains a plurality of the disk cartridges including a set of at least two disk cartridges coupled together.

Thus, the invention described herein makes possible the advantages of providing (1) a disk cartridge in which an optical disk remains protected from dust, (2) a disk cartridge which can be coupled one another and suitable for a miniaturized disk changer apparatus, (3) a disk cartridge which is protected against careless handling by providing at each side of the disk cartridge a secure lock mechanism having two release mechanisms, and (4) a disk drive and a drive method for using the same. Furthermore, by using the disk cartridge, the present invention makes possible the advantages of providing (5) a disk changer apparatus in which space for allowing dust to enter is minimized, (6) a disk changer apparatus into which it is easy to insert disk cartridges without the problems associated with a disk transfer mechanism in front of a disk stacker, and (7) a disk changer apparatus which is miniaturized and realizes a rapid disk change.

These and other advantages of the present invention will become apparent to those skilled in the art upon reading and understanding the following detailed description with reference to the accompanying figures.

BRIEF DESCRIPTION OF THE DRAWINGS

FIG. 12 is a perspective view of three coupled disk cartridges according to the present invention.

FIG. 23 is a schematic front view of the disk changer apparatus according to the present invention.

DESCRIPTION OF THE PREFERRED EMBODIMENTS

Hereinafter, the present invention will be described by way of illustrative examples with reference to the drawings.

EXAMPLE 1

Figure 1:
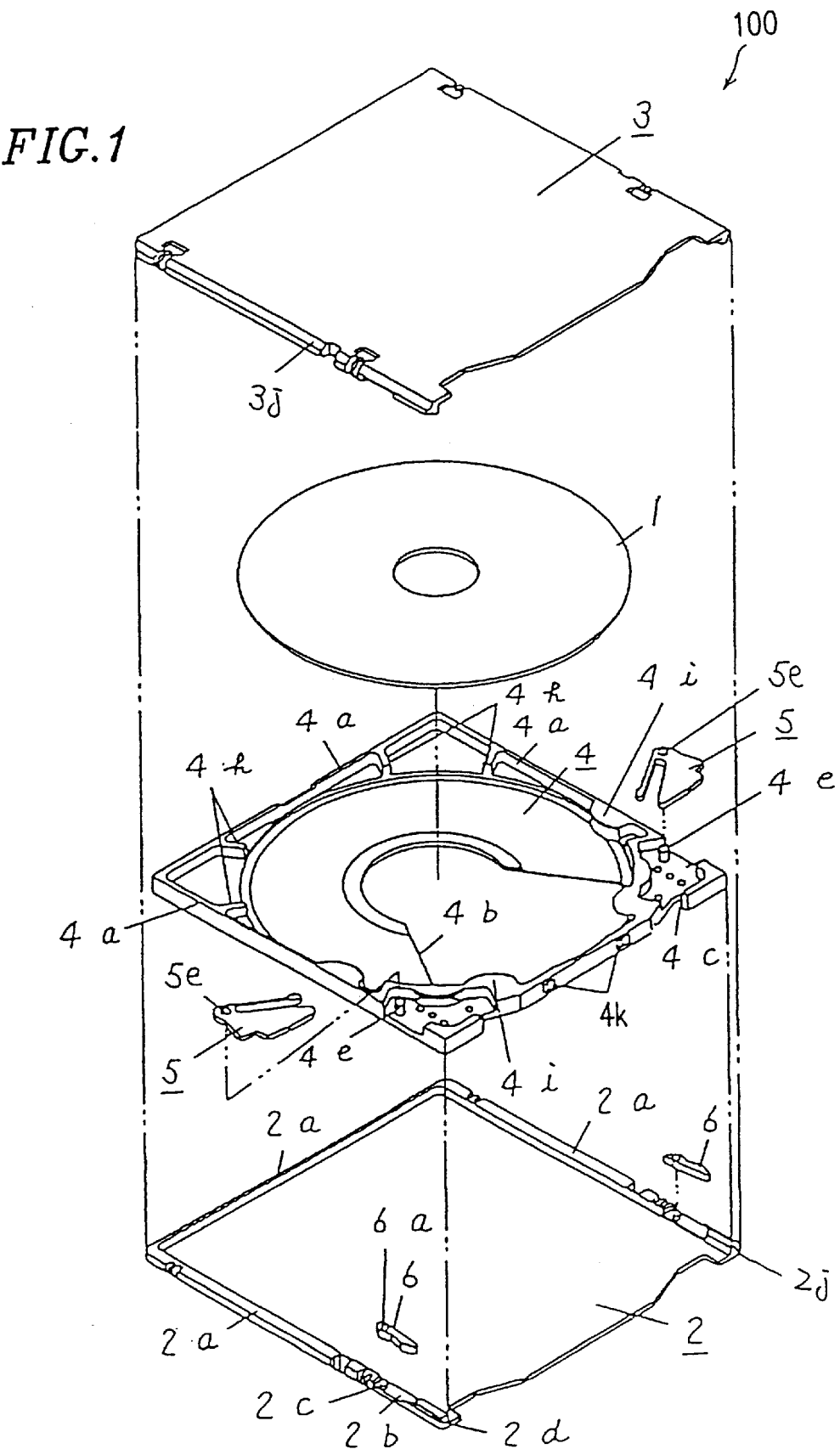
FIG. 1 is an exploded view showing a structure of a disk cartridge of one embodiment according to the present invention.
Figure 2A:
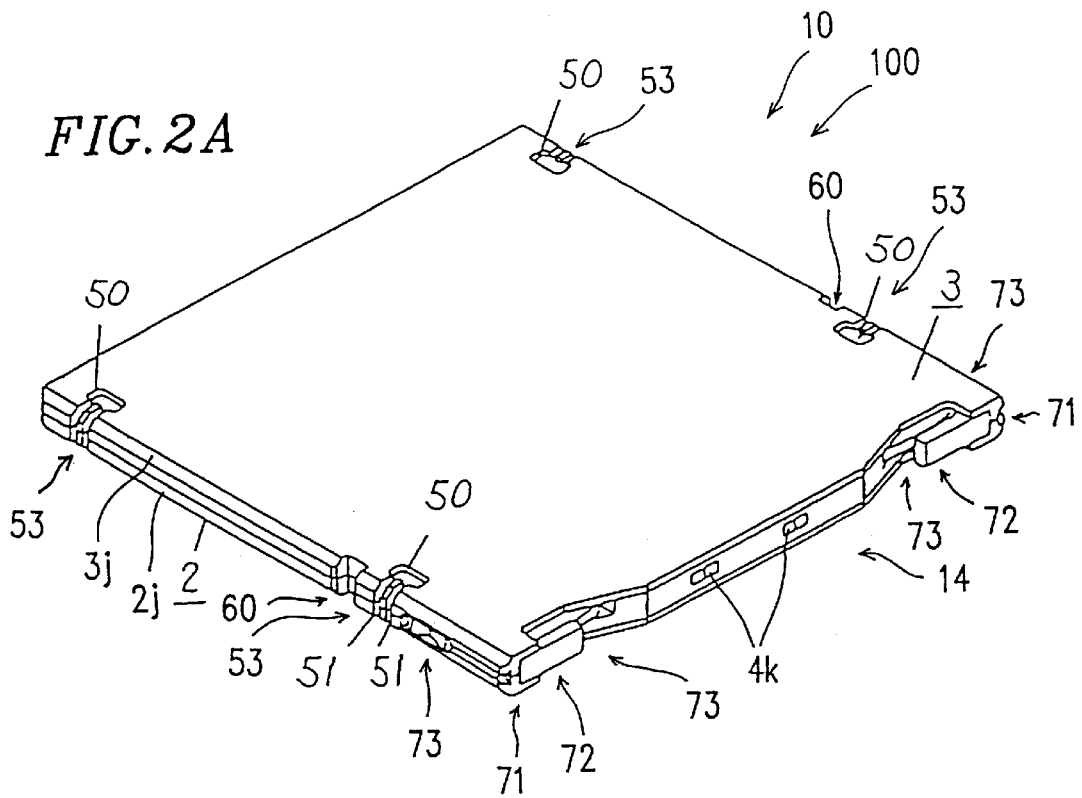
FIG. 2A is a perspective view of the disk cartridge in which an inner case is accommodated within an outer case.
Figure 2B:
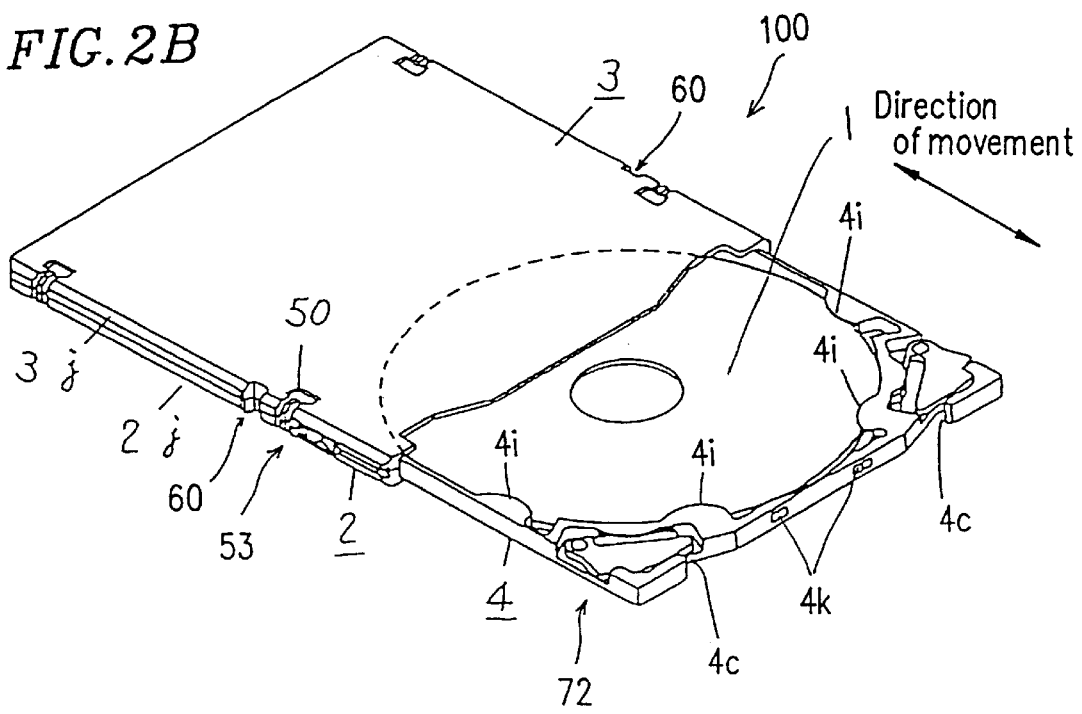
FIG. 2B is a perspective view of the disk cartridge of FIG. 2A in which the inner case is extended out more than half its diameter from the outer case.

FIGS. 1, 2A and 2B show a structure of a disk cartridge 100 in the first example of the present invention. The disk cartridge 100 includes a inner case 4 for holing an optical disk 1, an upper case half 3, and a lower case half 2. The upper case half 3 and the lower case half 2 form an outer case 10 for housing the inner case 4.

FIG. 2A shows the disk cartridge 100 in which the inner case 4 is completely accommodated within the outer case 10. FIG. 2B shows the disk cartridge 100 in which more than a half of the inner case 4 extends out from the outer case 10. The outer case 10 has a substantially rectangular-shape flat box configuration including an upper face of the upper case half 3, a lower face of the lower case half 2, and three side faces formed of edge portions of the upper case half 3 and the half 2. The fourth side face of the outer case 10 has an opening 14 (FIG. 2A) for allowing the inner case 4 to extend in and out. A secure lock mechanism 71, discussed more fully below in relation to 3A–3B, and 4A–4B, is provided in the vicinity of the opening 14 for locking up the inner case 4 in the outer case 10 in order to prevent the optical disk 1 from extending undesirably out from the disk cartridge 100. As shown in FIGS. 2A and 2B, the outer case 10 has bevels 2j and 3j on the four side edges which are transverse the opening 14. These side edges and the function thereof are discussed below in connection with FIGS. 19 and 21–26. Furthermore, the outer case 10 has a coupling structure 53 for coupling a plurality of the disk cartridges 100 in a thickness-direction thereof as discussed below in relation to FIGS. 6 and 10.

Initially, the secure lock mechanism 71 will be described. The secure lock mechanism 71, as shown in FIG. 2A, includes a lock mechanism 72 provided in each corner of a pull-out side of the inner case 4 and a release mechanism 73 provided in each side face of the outer case 10 in the vicinity of the opening 14.

Figure 3A:
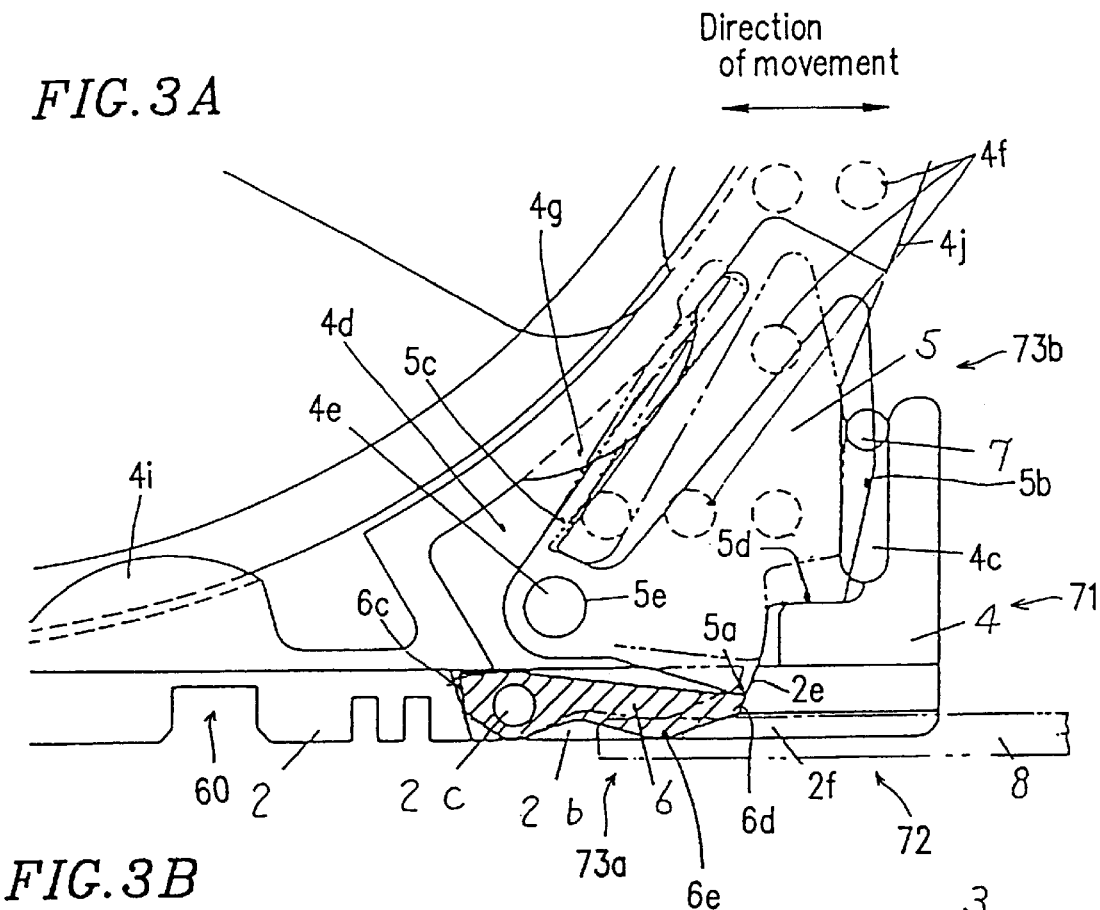
FIG. 3A is an enlarged plan view of a secure lock mechanism of the present invention.
Figure 4A:
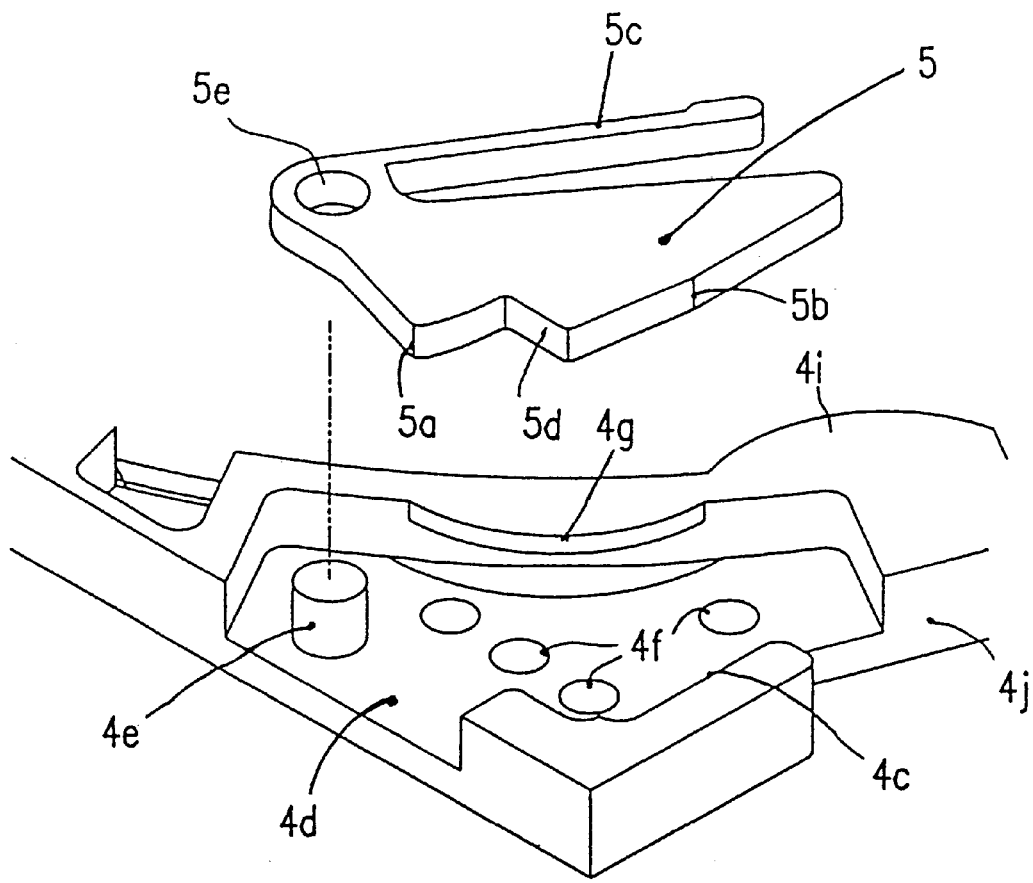
FIG. 4A is a view of a corner portion of the inner case before a lock cam is inserted.
Figure 4B:
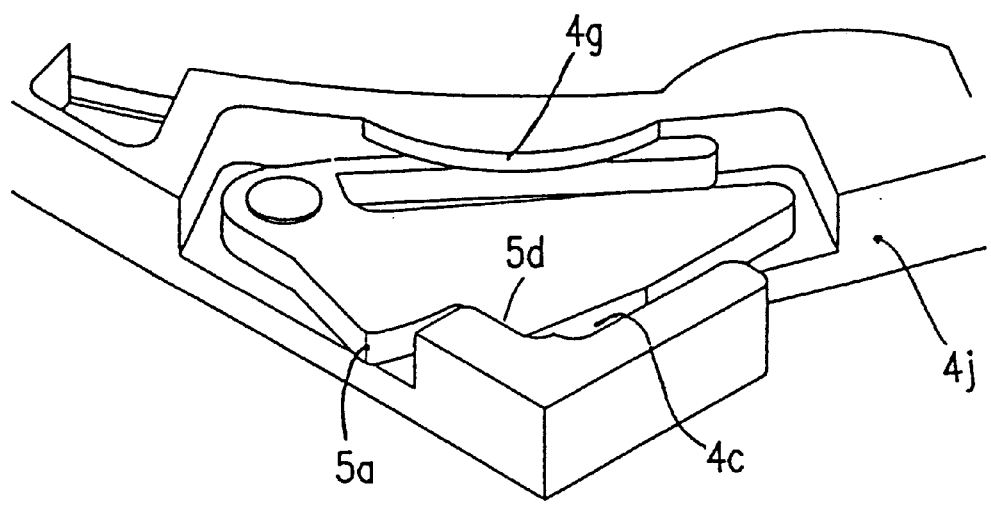
FIG. 4B is a view of the corner portion of the inner case after the lock cam is inserted.

As shown in FIG. 3A, each lock mechanism 72 has a lock cam 5 which engages an inside edge 2e of the outer case 10 in the locked position. As shown in FIGS. 4A and 4B, the lock cam 5 is inserted in a flat 4d (a concave portion) in each corner of the pull-out side of the inner case 4. FIGS. 4A and 4B show the lock mechanism 72 before and after the lock cam 5 is inserted into the flat 4d, respectively. It will be appreciated that the lock mechanism 72 on both sides of the opening 14 are basically identical, one being the mirror image of the other.

Inside each corner, as shown in FIG. 3A, a U-shape cutout 4c is provided along the pull-out side of the inner case 4 (i.e., perpendicular to a sliding direction, e.g., direction of movement, of the inner case 4). At an open end of the U-shape cutout 4c, a slope 4j is formed to lead to the front portion of the pull-out side. A cylinder-shape cam pivot 4e is provided on the flat 4d close to an outer edge of the inner case 4. The lock cam 5 is positioned on the flat 4d such that a hole 5e of the lock cam 5 is aligned with the cam pivot 4e. The cam pivot 4e fits through the hole 5e such that the lock cam 5 rotates about the vertical axis of the cam pivot 4e. The lock cam 5 includes a projecting portion 5a which protrudes outward (downward in relation to FIG. 3A) from the inner case 4 at the locked position, a release portion 5b which protrudes into the U-shape cutout 4c at the locked position, a spring portion 5c for returning the lock cam 5 to the locked position, and a stopper portion 5d for positioning the lock cam 5.

The inner case 4 has an arc-shape projection 4g for preventing the lock cam 5 from coming out of the flat 4d, and the lock cam 5 is inserted into the flat 4d with its spring portion 5c being bent.

Figure 5:
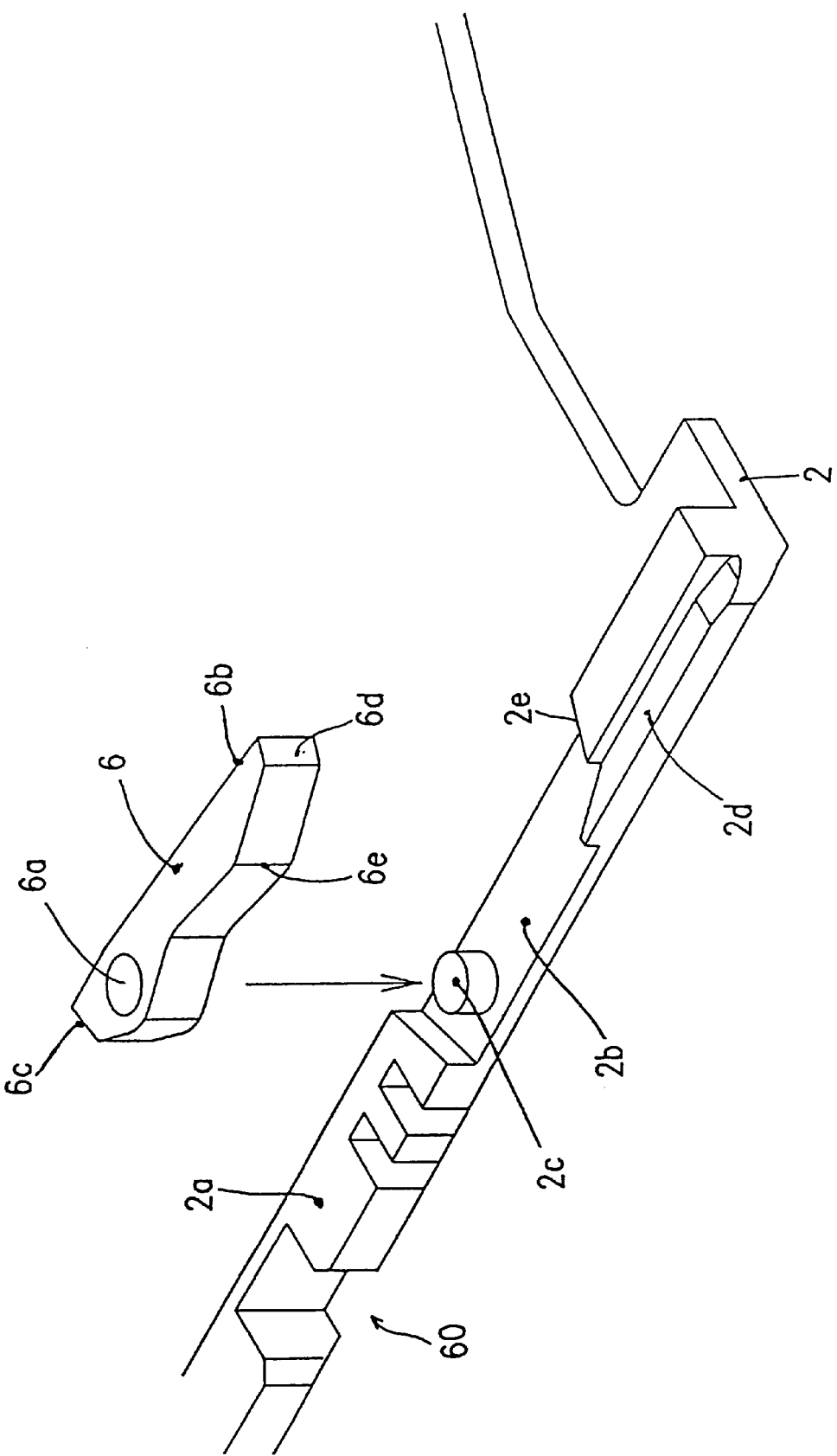
FIG. 5 is a partial perspective view of the disk cartridge where a lock-release lever is provided.

As shown in FIG. 3A, the release mechanism 73 includes two release mechanisms 73a and 73b. The release mechanism 73b will be discussed below with describing the operations of the secure lock mechanism 71. The release mechanism 73a has a release lever 6 for operating on and moving the lock cam 5 to the released position where the lock cam 5 does not engage with the outer case 10 at the edge 2e. As shown in FIG. 5, the lower case half 2 has a flat 2b which is formed by cutting out the edge 2a of the lower case half 2. A cylinder-shape lever pivot 2c is provided on the flat 2b. A step portion 2d is formed along the edge 2a in the sliding direction of the inner case 4.

The release lever 6 is positioned on the flat 2b such that a hole 6c of the release lever 6 is aligned with the lever pivot 2c. The lever pivot 2c fits through the hole 6c such that the release lever 6 rotates about the vertical axis of the lever pivot 2c. The release lever 6 includes a lever portion 6b for thrusting the projecting portion 5a of the lock cam 5, protrudent sides 6c and 6d for regulating a pivoting range of the release lever 6, and a thrust-cam portion 6e for receiving an external force to be acted on the release lever 6.

Figure 3B:
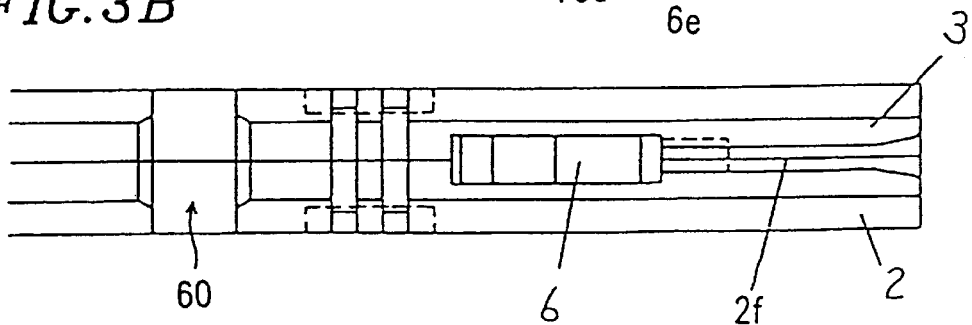
FIG. 3B is an enlarged side view of a secure lock mechanism of the present invention.
Figure 6:
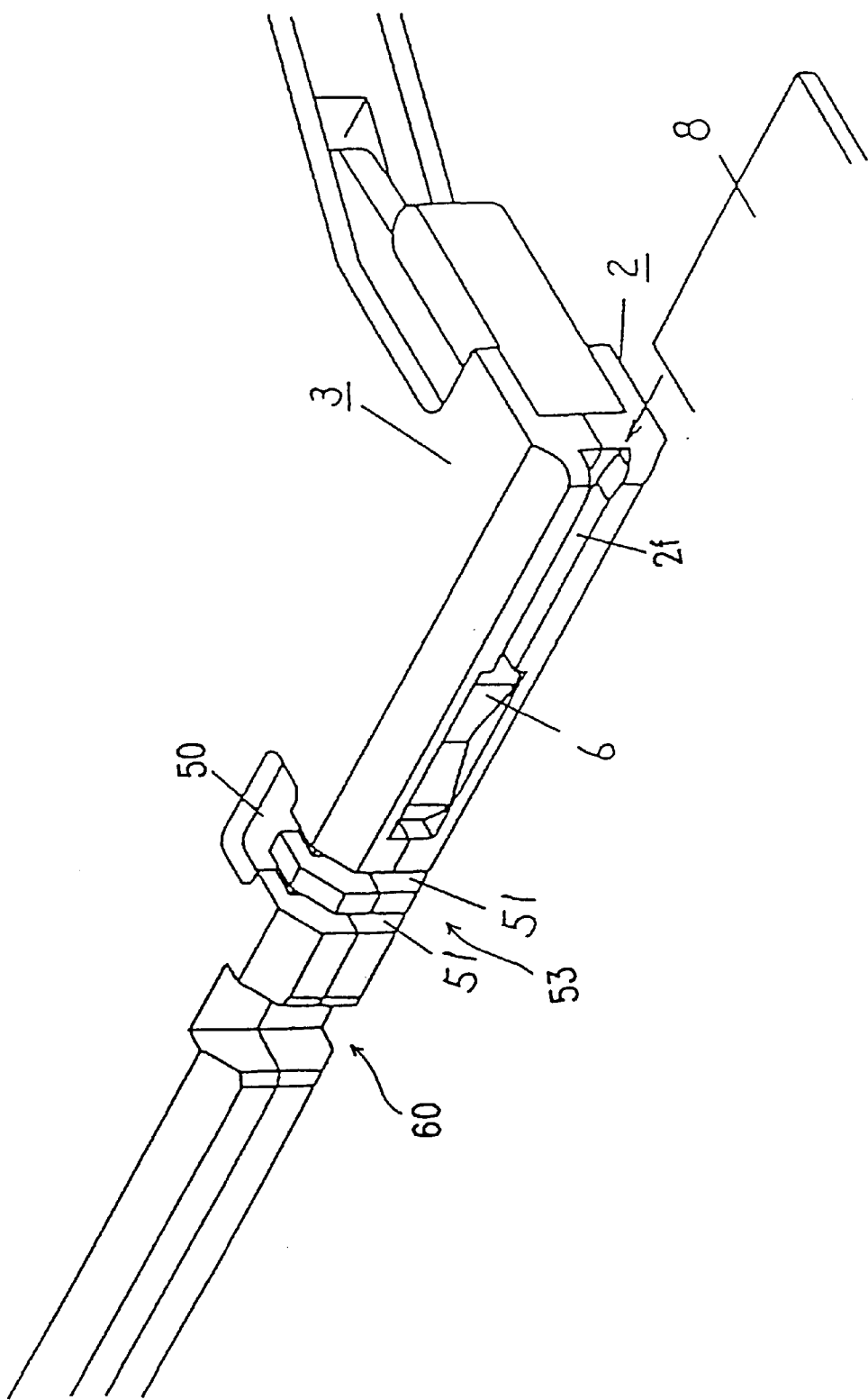
FIG. 6 is a partial perspective view of the corner portion of the disk cartridge of a pulling-side.

The upper case half 3 is formed symmetrically to the lower case half 2 with respect to the joining plain of the upper and lower halves 2 and 3. Accordingly, by joining the upper and lower halves 2 and 3, a housing (release hole) is formed so as to accommodate the release lever 6 as shown in FIGS. 3B and 6. A groove 2f is formed by the step portions of the upper and lower halves 2 and 3, which extends from the side edge of the opening 14 to the release hole along the sliding direction of the inner case 4.

The secure lock mechanism 71 provided in the other corner is symmetrically the same as that in the one corner described above.

Next, operations of the secure lock mechanism 71 will be described more in detail.

In FIG. 3A, the lock cam 5 and the release lever 6 at a locked position are indicated by a solid line and those at a released position are indicated by a two-dot chain line.

In the locked position, the lock cam 5 is pushed by the restitutive force of the spring portion 5c in a clockwise direction, and is positioned by the stopper portion 5d bumping against the edge of the inner case 4. In this position, the projecting portion 5a protrudes from the inner case 4 into the release hole so as to engage with the edge 2e of the release hole. The wall of the edge 2e is configured along an arc of the circle of which center is at the axis of the cam pivot 4e. Therefore, no force in the counterclockwise direction is act on the lock cam 5 even if a strong external force in the pulling-out direction is acted on the inner case 4. This makes the lock mechanism 72 not released by the external force in the pull-out direction, completely preventing the inner case 4 from carelessly coming out of the outer case 10.

There are two ways to release the lock mechanism 72. The release mechanism 73a is used for one way, and the release mechanism 73b is used for the other way.

A first way using the release mechanism 73b is as follows. As shown in FIG. 3A, a release pin 7 is inserted into the U-shape cutout 4c so as to thrust the release portion 5b of the lock cam 5 which protrudes into the U-shape cutout 4c. The lock cam 5 is rotated from the lock portion to the release portion, so that the projecting portion 5a is drawn in the inner case 4 to release the lock.

A second way for using the release mechanism 73a is as follows. A guide piece 8 is inserted in the groove 2f extending from the side edge of the opening 14 to the release hole, so as to operate the release lever 6 positioned in the release hole. The guide piece 8 thrusts the thrust-cam portion 6e to move the release lever 6. The release lever 6 thrusts the lock cam 5 to rotate in the counterclockwise direction whereby the projecting portion 5a is drawn in the inner case 4 to release the lock.

Typically, the guide piece 8 is provided in a guiding groove for a disk cartridge of a disk drive. The disk cartridge 100 is inserted in the disk drive guided by the guide piece 8. The guide piece 8 inserted in the groove 2f moves the release lever 6, whereby the lock mechanism 72 in one corner of the disk cartridge 100 is released as described above.

Figure 7:
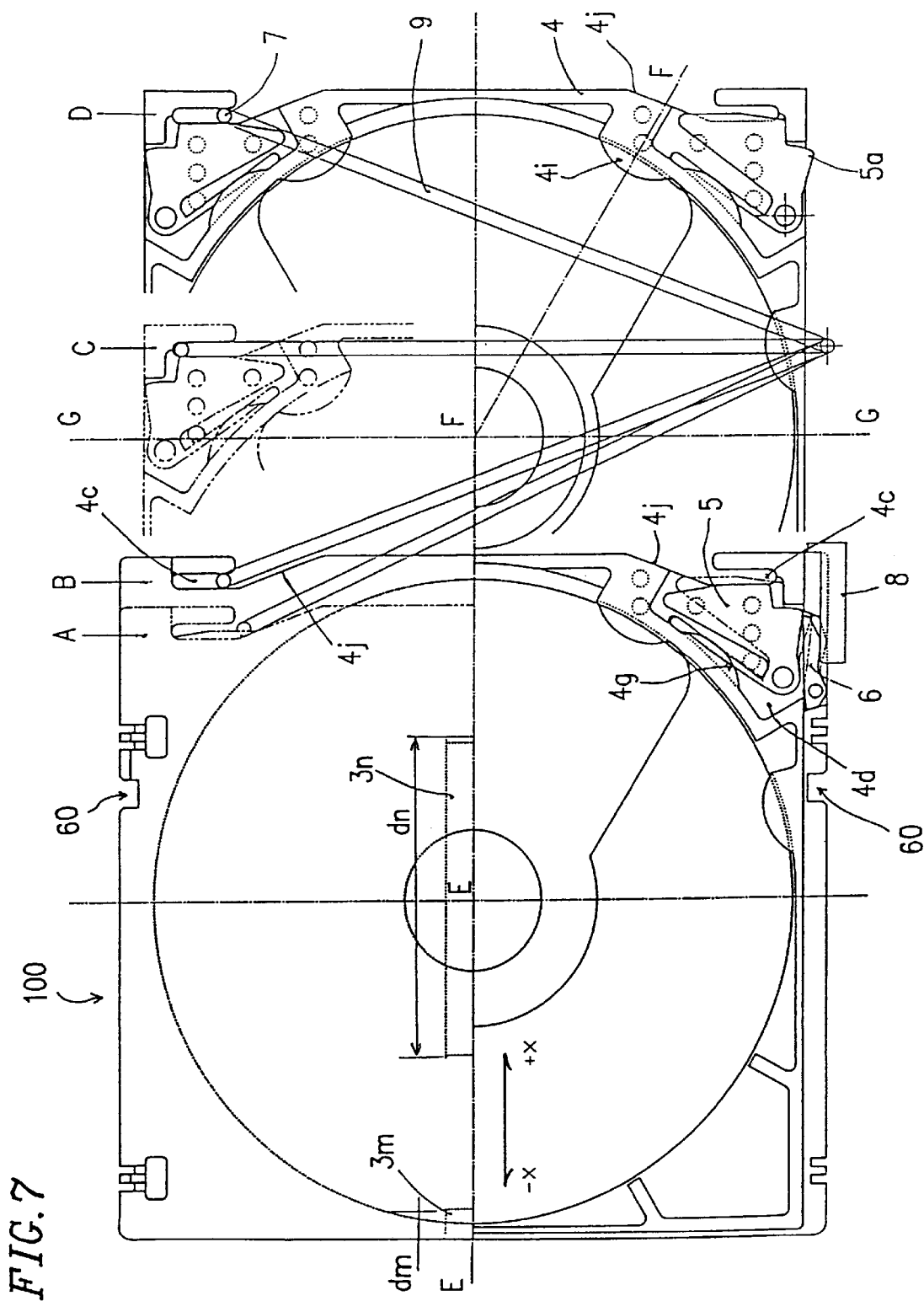
FIG. 7 is a diagram illustrating a method for releasing the lock mechanism and pulling out the inner case.

As shown in FIG. 7, the disk cartridge 100 is inserted in the guiding groove which has the guide piece 8 at one side corresponding to one of the corner of the disk cartridge 100. The disk cartridge 100 is guided by the guide piece 8 and the lock mechanism 72 of the one side is released when the disk cartridge 100 comes to the fully inserted position. Then the lock mechanism 72 in the other corner is released by the release pin 7 and the inner case 4 extends out from the outer case 10. The release pin 7 is provided on a tip portion of a pull-out lever 9 of the disk drive. Another tip portion of the pull-out lever 9 is a fulcrum of rotation of the pull-out lever 9, which is positioned outside of the disk cartridge 100. The pull-out lever 9 is rotated around the fulcrum by an external force.

When the disk cartridge 100 is inserted in the disk drive guided by the guide piece 8 (at position A), the release pin 7 moves toward the open end of the U-shape cutout 4c along the slope 4j which is provided on the upper and lower halves 3 and 2. When the disk cartridge 100 is fully inserted so that the front side (insertion side) of the disk cartridge 100 reaches an end of the guide piece 8 (at position B), the release pin 7 is inserted in the U-shape cutout 4c to release the lock of the other corner. The slope 4j allows the release pin 7 to move smoothly.

When the lock of the both sides of the disk cartridge 100 is released, as shown in FIG. 7, the pull-out lever 9 rotates from position B through position C to position D so as to pull out the inner case 4. The U-shape cutout 4c is required to be longer enough to accommodate the release pin 7 moving along an arc orbit of the pull-out lever 9.

Figure 8:
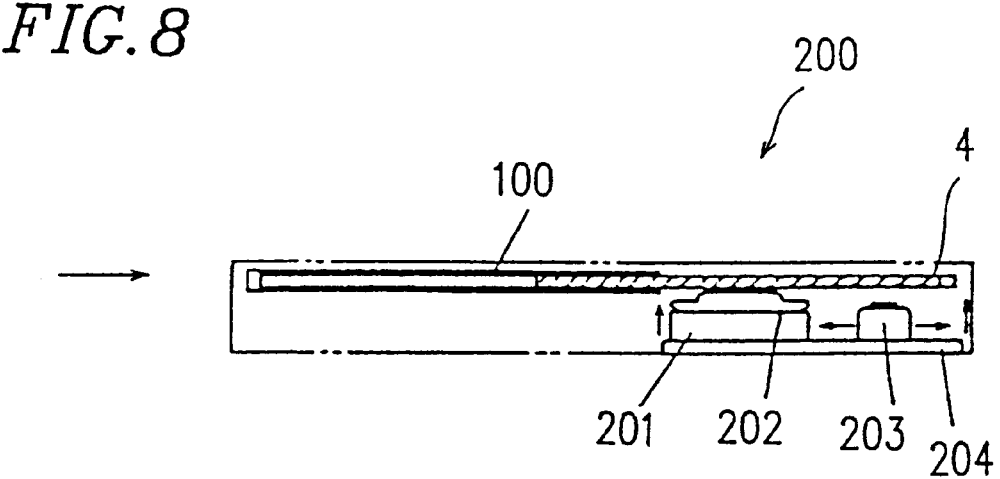
FIG. 8 is a schematic side view of a loading mechanism of a disk drive according to the present invention.

FIG. 8 schematically shows a loading mechanism of the disk drive 200 of the present invention. The disk drive 200 comprises on a base plate 204 a spindle motor 201, a turntable 202, and an optical pickup 203 including a traverse mechanism. When the inner case 4 extends out from the disk cartridge 100 which is inserted in the disk drive 200, the base plate 204 goes upward to clamp the optical disk 1 holed in the inner case 4. Read/write operation is performed for the optical disk 1 at the position where the inner case 4 extends out. The inner case 4 extends out by more than a half of it in order to allow the turntable 202 to chuck with the optical disk 1. When the read/write operation is finished, the inner case 4 is put back in the outer case 10 and the disk cartridge 100 becomes in a standing-by state.

As described above, since the disk cartridge 100 is not moved downward as is in a case of the conventional disk drive, no aperture is caused in an upper portion of the front opening of the disk drive 200. Furthermore, no room is required for allowing the disk cartridge to move in the perpendicular direction. Therefore, a larger space other than a room for moving the optical pickup 203 and the turntable 202 is available to be used for peripheral circuits, whereby the disk drive 200 can be miniaturized and made thinner.

According to the loading mechanism of the present invention, the inner case 4 is put back into the outer case 10 whenever read/write operation is finished, so that the optical disk 1 is fully contained in the disk cartridge 100 in the stand-by state. Therefore, dust which may cause errors cannot stick to the optical disk 1 even if the disk cartridge 100 is left inserted in the disk drive 200.

The secure lock mechanism 71 is provided in the both sides of the disk cartridge 100, so that the inner case 4 cannot be pulled out unless the locks of the both sides are released at the same time. Accordingly, even if one of the locks should be released by any chance such as a shock in an automobile, the inner case 4 is not carelessly pulled out.

The release mechanism 73 is provided at the both corners in vicinity of the opening 14. Therefore, it is not required for the disk cartridge 100 to be fully inserted in the disk drive 200 in order to be released. The length of the guiding groove of the disk drive 200 can be made shorter than that of the disk cartridge 100. This make it possible to reduce the size of the disk drive 200, for example, in which the disk cartridge 100 is used by partially inserted.

The secure lock mechanism 71 has two release mechanisms 73a and 73b so that the lock can be released in the two different manners. This increase the degree of freedom for designing the loading mechanism of the disk drive, which will allow developing many kinds of the disk drive.

The outer case 10 does not have an opening for inserting an optical pickup as is in the case of the conventional disk cartridges. The inner case 4 extends out from the outer case 10 when the optical disk 1 is used. Therefore, the disk cartridge 100 does not need a shutter which weaken the strength of a disk cartridge. The optical disk 1 is well protected from dust by the disk cartridge 100 because the disk cartridge 100 has little aperture allowing dust to come in. This makes the disk cartridge 100 easy to handle.

In addition, large regions of the upper face and the lower face of the disk cartridge 100 can be effectively used by eliminating the shutter. For example, a large label can be attached to the upper or lower face. The conventional disk cartridge is enclosed in a protect case with a printed matter when it is dealt. On the other hand, the disk cartridge 100 can be dealt without the protect case, and a lot of information can be carried by putting a large label instead of the printed matter which is enclosed in the case. This can reduce the cost.

Next, the coupling mechanism of the disk cartridge 100 will be described. As shown in FIGS. 2A and 2B, the outer case 10 has bevels 2j and 3j on four side edges which are parallel to the pull-out direction of the inner case 4. The bevels 2j and 3j are in a same size. The outer case 10 has a coupling structure 53 in the vicinity of each of the four corners for coupling a plurality of the disk cartridges 100 in a thickness-direction thereof.

Figure 9:
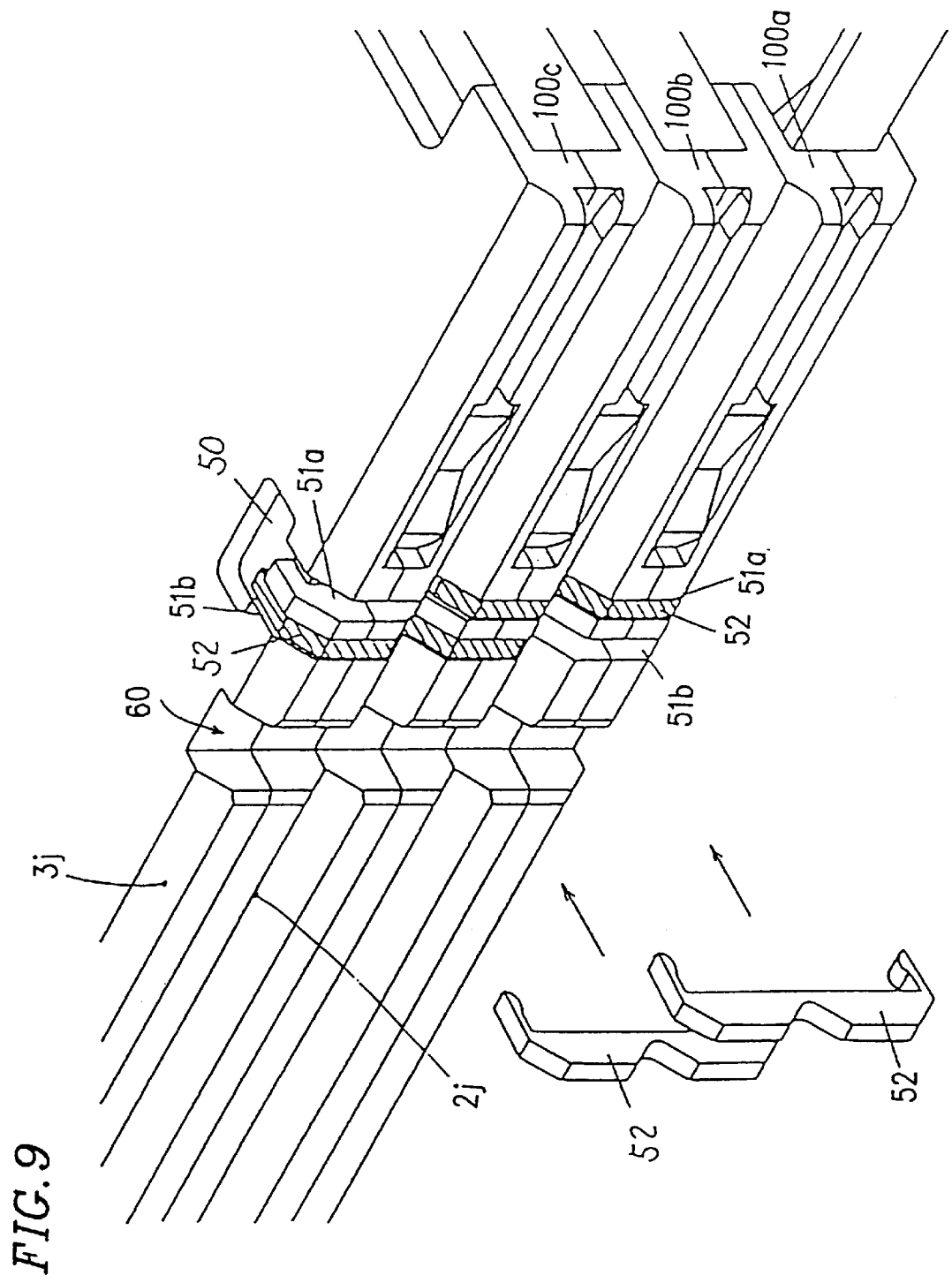
FIG. 9 is a perspective view explaining the coupling of a plurality of disk cartridges according to the present invention.
Figure 10:
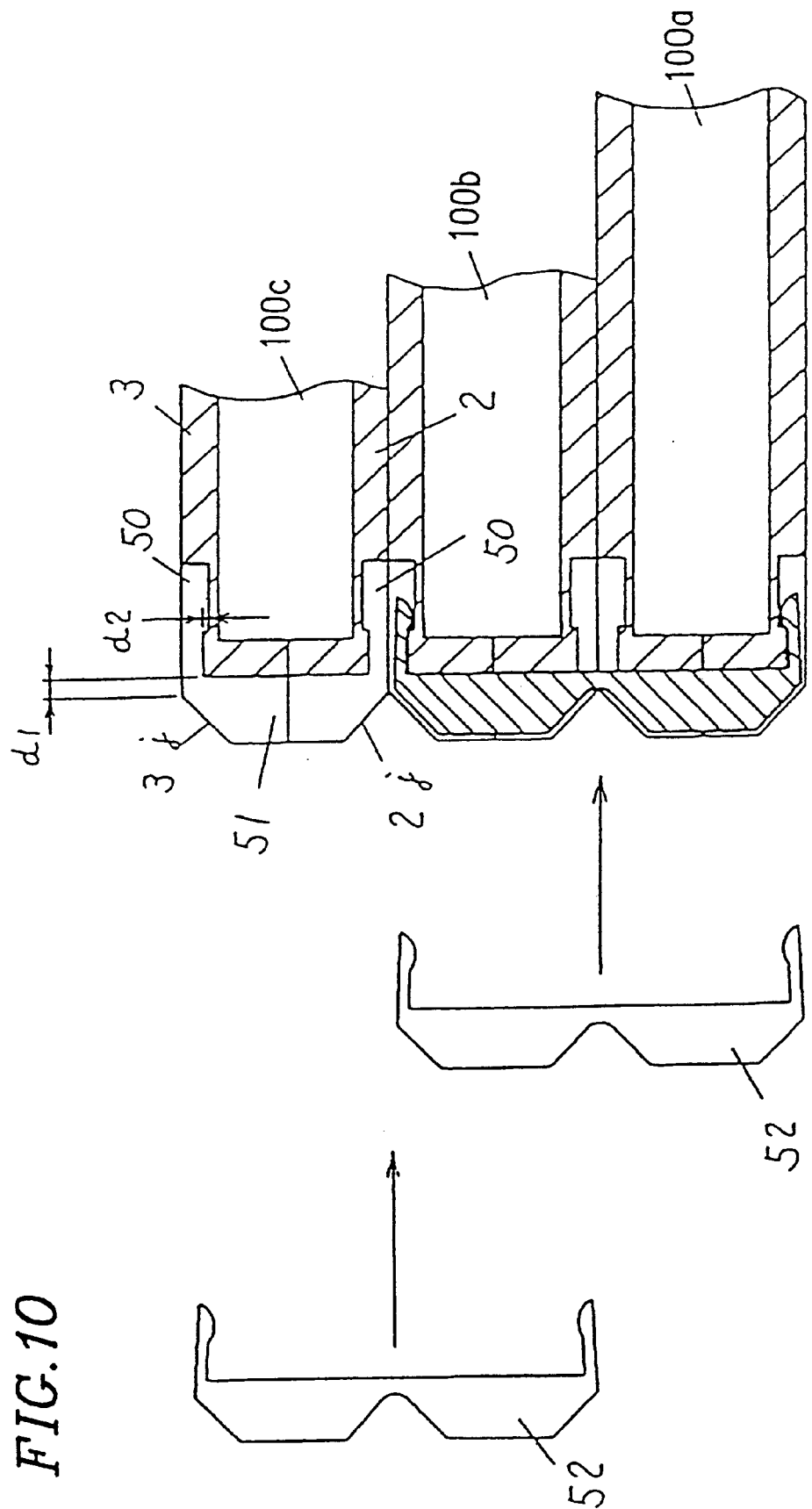
FIG. 10 is a partial cross-sectional view showing the coupling structure of the disk cartridges according to the present invention.

The coupling structure 53 in each corner includes, as shown in FIG. 6, a relatively deep pit 50 formed on each of the upper face (upper case half 3) and the lower face (lower case half 2), and two grooves 51 which are formed on the side face including the bevels 2j and 3j so as to connect the pits 50 of the upper and lower faces. FIG. 9 shows a plurality of the disk cartridges 100 which are arranged and coupled so that an upper face of each disk cartridge 100 comes into contact with a lower face of an adjacent one. The openings 14 of the plurality of the disk cartridges 100 are aligned along one plain. The two grooves 51 are denoted as 51a and 51b in FIG. 9. FIG. 10 is a cross-sectional view of the coupling structure 53 taken along the grooves 51. The three disk cartridges 100a, 100b, and 100c coupled together are shown in these figures.

A groove-like cavity is formed between each two adjoining disk cartridges 100 by the bevel 2j of the lower case half 2 and the bevel 3j of the upper case half 3. By forming ridges corresponding to the groove-like cavities on a bottom face of a disk stacker of the disk changer apparatus, the disk stockier can contain a plurality of the disk cartridges 100 with the ridges engaging with the groove-like cavity so as to reduce a useless space.

As shown in FIG. 10, grooves 51 are shallower than the pit 50 by a depth $d_2$ on the upper and lower face, and deeper than the bevels 2j and 3j by a depth $d_1$ on the side face including the bevels 2j and 3j. A square-C shape coupling member 52 made of an elastic material such as metal or resin is inserted in each of the grooves 51 so as to couple the adjoining disk cartridges 100.

The coupling mechanism will be described more in detail with reference to FIG. 9. The disk cartridge 100a and 100b are coupled by inserting the coupling member 52 in the right side grooves 51a thereof. Next, the disk cartridge 100b and 100c are coupled by inserting the coupling member 52 in the left side grooves 51b thereof, so that the disk cartridges 100a, 100b, and 100c are coupled together. A fourth disk cartridge 100 can be coupled by placing on the disk cartridge 100c and inserting the coupling member 52 in the groove 51a. By repeating this, an infinite number of the disk cartridges 100 can be coupled.

Figure 11:
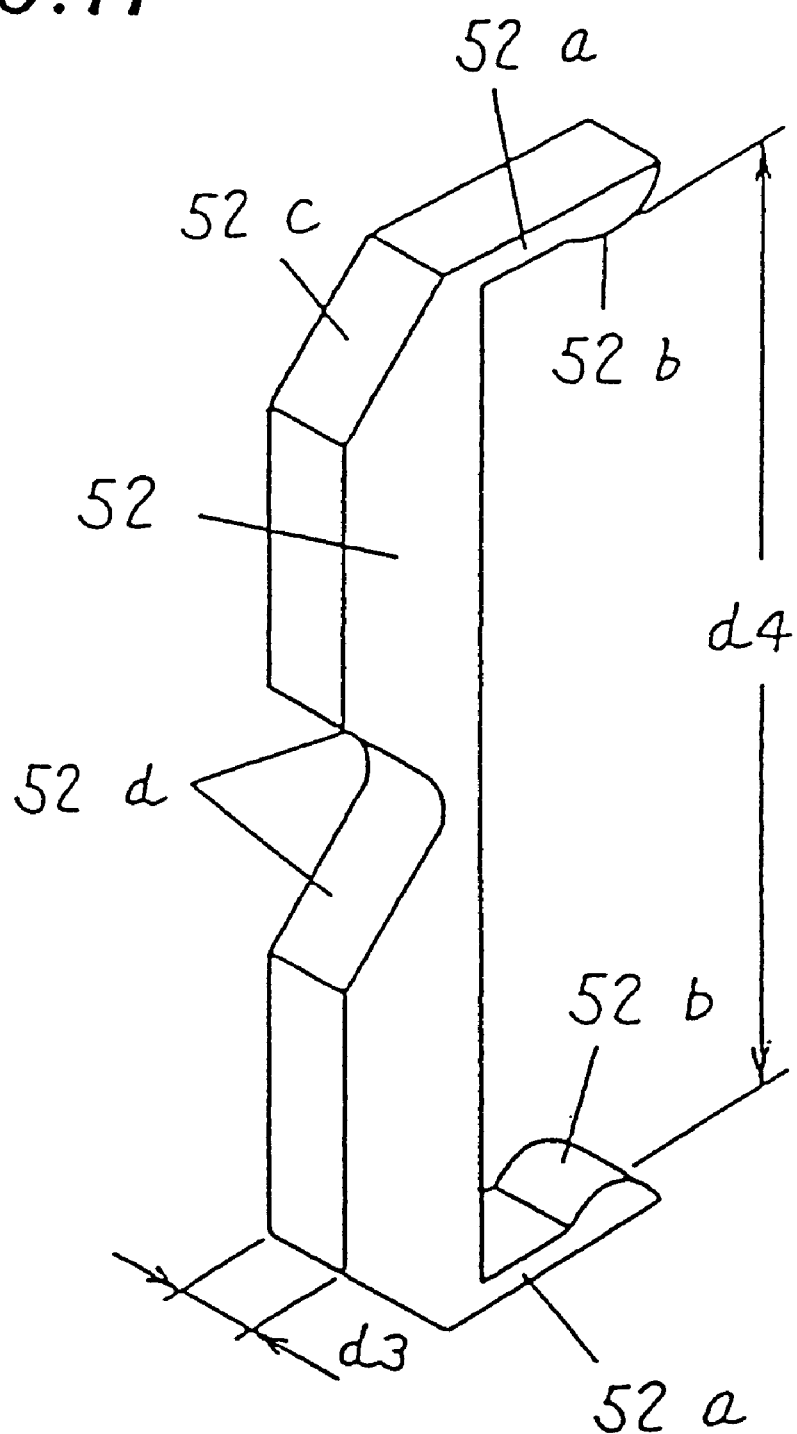
FIG. 11 is a perspective view of the coupling member of the present invention.

Next, the coupling member 52 will be described more in detail with reference to FIG. 11. As shown in FIG. 11, the coupling member 52 is made of an elastic material having a squared-C shape with a width $d_3$. The coupling member 52 has a leaf spring 52a at each end. The leaf spring 52a includes a fixing portion 52b at the tip. A distance $d_4$ between the two fixing potion 52b is slightly smaller than a measure of the thickness of the two disk cartridge 100 minus twice the depth of the pit 50. Accordingly, when the coupling member 52 is inserted in the groove 51, the disk cartridges 100 are pressed against each other by an elastic force of the leaf spring 52a. The fixing potion 52b engages with a step $d_2$ of the pit 50 so as to prevent the coupling member 52 from falling off. The thickness $d_3$ is slightly smaller than the width of the groove 51 so that the coupling member 52 is smoothly inserted and engaged with the groove 51. The coupling member 52 prevents the disk cartridges 100 from sliding off each other.

The coupling member 52 has cutouts 52c and 52d on an outside face (i.e. the opposite side of the inserting face). The cutouts 52c and 52d are formed on the outside face in accordance with the profile of the side face of the outer cases 10 including the bevels. When the coupling member 52 is fully inserted in the grooves 51, the shape of the coupling member 52 is congruent with the shape of the side faces of the two coupled disk cartridges 100.

FIG. 12 shows three coupled disk cartridges. Adopting the pull-out inner case 4 instead of using a shutter enables a plurality of the disk cartridges 100 to be coupled to use. A set of the coupled disk cartridges 100 provides a huge capacity for handling a large amount of information at a time. For example, a two-disk set or three-disk set can be made. This makes it convenient to carry or deal the disk cartridges 100.

By using a suitable disk changer apparatus for the disk cartridge 100, single (uncoupled) disk cartridges and the coupled disk cartridges can be handled all together so that a large amount of information can be handled easily. A capacity of the set can be easily adjusted by selecting a number of the disks to be coupled. Adjusting the capacity by a number of the disks is much easier than that by making various kinds of disks which have different diameters corresponding to different capacities. The present invention is advantageous for a mass production to reduce the cost.

Next, other structures of the disk cartridge 100 will be described. As shown in FIG. 1, the inner case 4 is formed into a substantially rectangular plate shape having an edge 4a which is formed thicker than the central region. Ribs 4h extend from the edge 4a toward the central portion of the inner case 4. The ribs 4h have the same height as that of the edge 4a. The ribs 4h increase the rigidity of the inner case 4 and prevent an inside surface of the outer case 10 from coming into contact with the optical disk 1 when the inner case 4 is housed in the outer case 10.

The inner case 4 has a sectorial cutout 4b for inserting a turntable and an optical pickup during read/write operation. The cutout 4b has the sectorial shape since the inner case 4 extends out by more than a half but not by its entirety when the disk cartridge 100 is used. By forming the cutout 4b in a sectorial shape, the inner case 4 can be stronger than that having a circular cutout slightly smaller than the optical disk.

The inner case 4 has arc-shape projections 4i for preventing the optical disk 1 from come out of the inner case 4. The arc-shape projections 4i are positioned at a peripheral of a housing for the optical disk 1 in a half region of the inner case 4 which pulled out from the outer case 10. The arc-shape projection 4i is formed so as to have an enough distance from a base surface of the inner case 4 for accommodating a thickness of the optical disk 1 and a flutter out of the ideal plain of rotation of the optical disk 1.

Figure 13B:
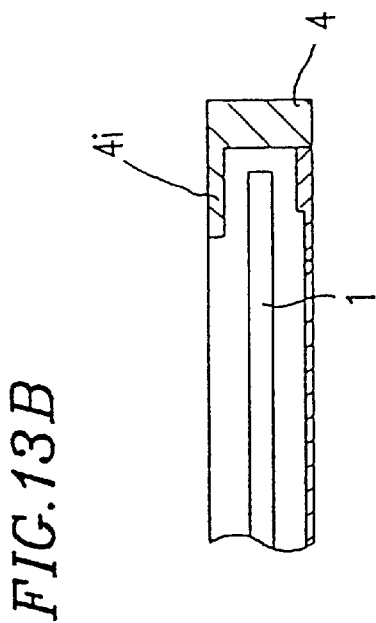
FIG. 13B is a cross-sectional view taken along the line F—F in FIG. 7.
Figure 13A:
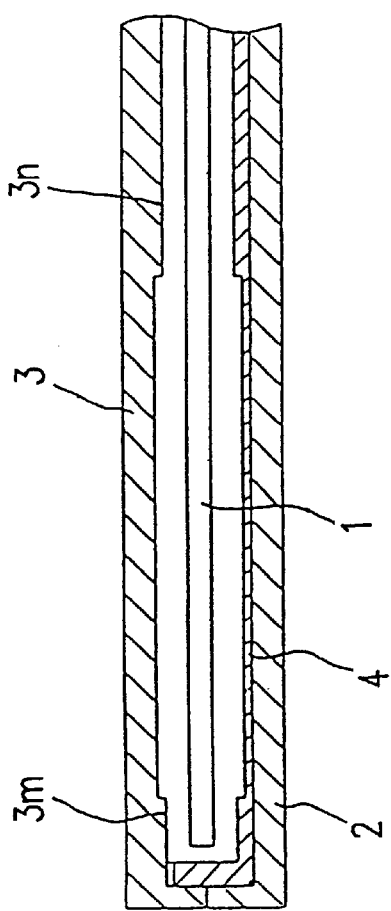
FIG. 13A is a cross-sectional view taken along the line E—E in FIG. 7.

As shown in FIG. 7, the upper case half 3 has projections 3m and 3n on the inner surface along the center line E—E in the pull-out direction of the inner case 4. FIGS. 13A and 13B show cross-sectional views taken along E—E line and F—F line in FIG. 7, respectively. A height of the projection 3m and 3n are determined in the same way as the distance between the arc-shape projection 4i and the base surface of the inner case 4. Respective lengths $d_m$ and $d_n$ of the projection 3m and 3n are determined so that the projections 3m and 3n are formed in an area other than an area corresponding to a read/write region of the optical disk 1 in a position before and after the inner case 4 extends out. The projections 3m and 3n protect a recording surface of the optical disk 1 from being damaged by contact with the upper case half 3. By implementing the above mentioned disk-holding and disk-protecting mechanism, the disk cartridge 100 can be used for an optical disk 1 having both sides for recording.

The inner case 4 has a write protect mechanism 4k on the pull-out side face (hereinafter, referred to as a front side face). As shown in FIGS. 1, 2A, 2B, and 12, the write protect mechanism 4k includes a pair of rectangular-shape holes provided symmetrically with respect to the center line. A slidable lever is provided in each of the holes so as to move inward to or outward from the center line. By detecting the position of the lever, whether the optical disk is write-protected or not is identified. The holes may be formed into an elliptic shape.

The inner case 4 has a portion for recording disk management information in an area pulled out from the outer case 10. The disk management information indicates a kind of the disk or writable regions of the disk and the like. As shown in FIG. 4A, by providing ID detecting holes 4f on the flat 4d, bit-information can be assigned corresponding to a number of holes 4f. The ID detecting holes 4f are arranged in a plurality of rows along the pull-out direction of the inner case 4. The ID detecting holes 4f are exposed on a back face of the inner case 4 when the inner case 4 extends out. By detecting the ID detecting holes 4f by an optical sensor, the disk management information can be obtained when the inner case 4 extends out to use the optical disk. In this example, the ID detecting holes 4f are arranged in three rows, so that three optical sensors are required to detect the holes 4f.

As shown in FIGS. 2A and 2B, the outer case 10 has a slot 60 in each side face including the bevels. The slot 60 is used for holding the disk cartridge 100 in a disk stacker.

EXAMPLE 2

Figure 14:
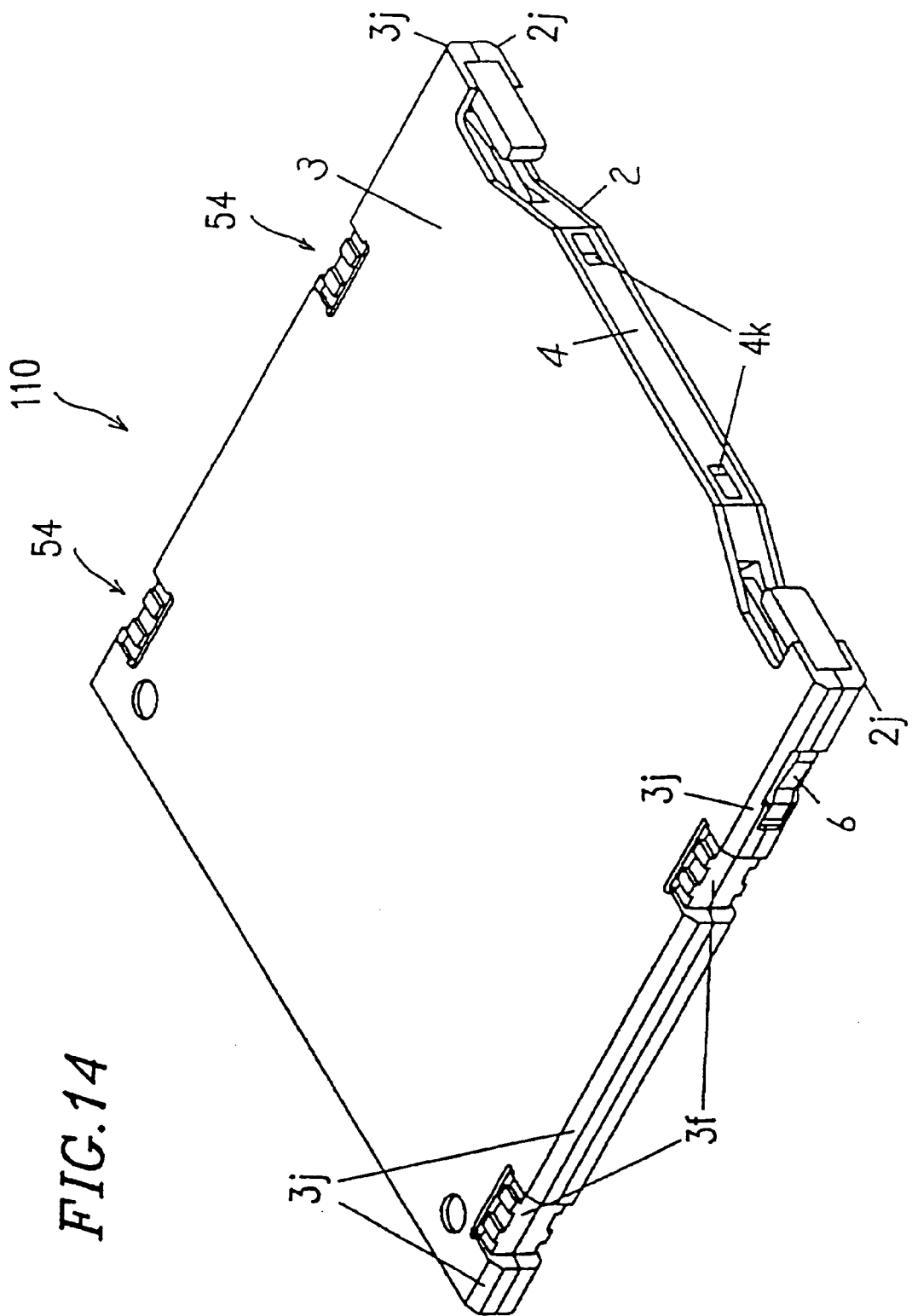
FIG. 14 is a perspective view showing a disk cartridge of another embodiment according to the present invention.

FIG. 14 shows a disk cartridge 110 in the second example of the present invention. The structure of the disk cartridge 110 is similar to that of the disk cartridge 100 shown in FIG. 1. The same portions as those of the disk cartridge 100 are denoted by the same numerical references.

The disk cartridge 110 includes a inner case 4 for holing an optical disk 1, an upper case half 3, and a lower case half 2. The upper case half 3 and the lower case half 2 form an outer case 10 for housing the inner case 4. FIG. 14 shows the disk cartridge 110 when the inner case 4 is fully accommodated in the outer case 10.

The disk cartridge 110 is different from the disk cartridge 100 in a structure of the secure lock mechanism 71 and the coupling mechanism.

First, the coupling mechanism of the disk cartridge 110 will be described. As shown in FIG. 14, the outer case 10 has bevels 2j and 3j on four side edges which are parallel to the pull-out direction of the inner case 4. The bevels 2j and 3j are in a same size. The outer case 10 has a coupling structure 54 in the vicinity of each of the four corners for coupling a plurality of the disk cartridges 110 in a thickness-direction thereof. The coupling structure 53 in each corner includes a squared C-shape cutout 3f formed in the side face including the bevels 2j and 3j.

Figure 15:
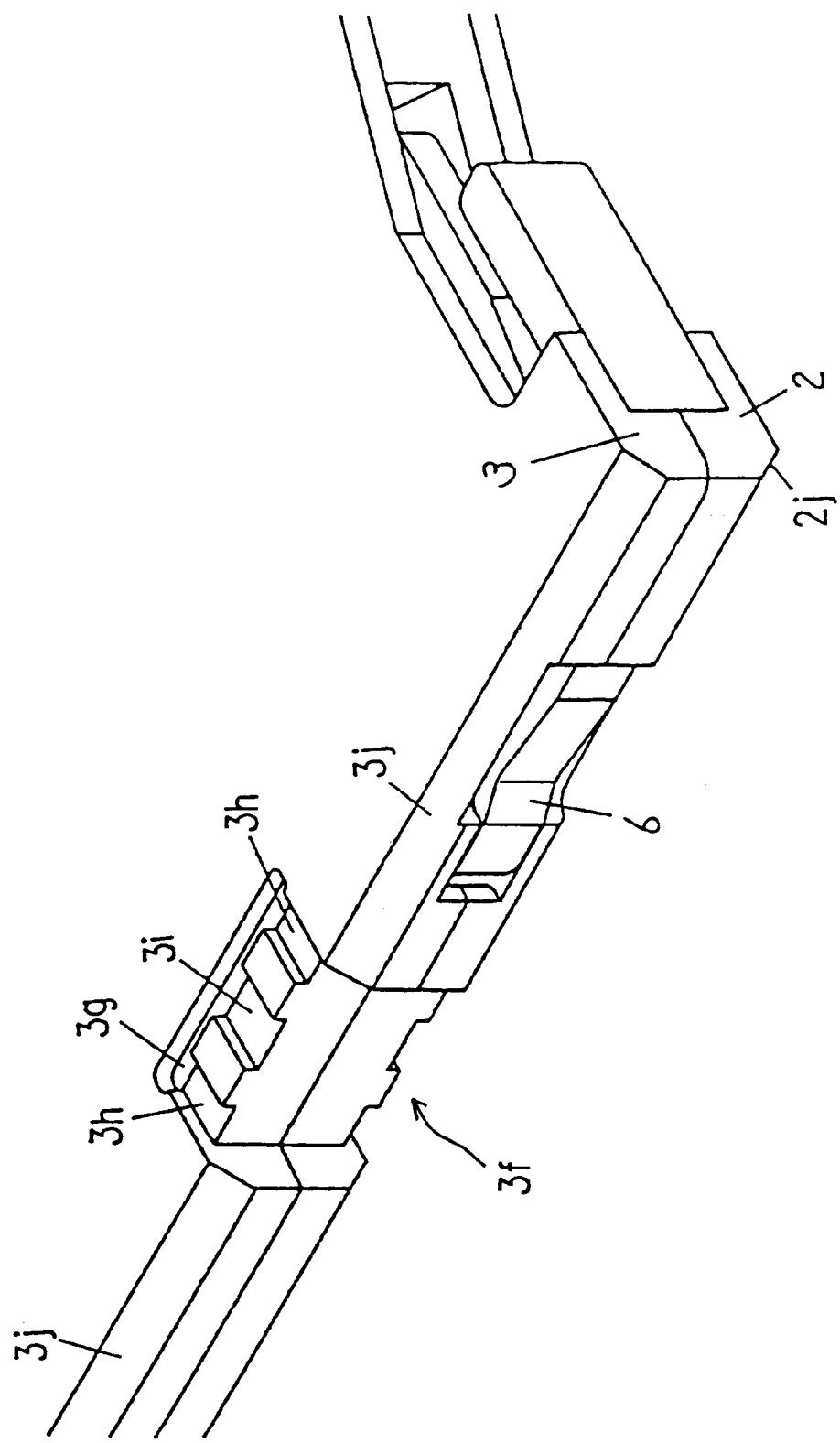
FIG. 15 is an enlarged perspective view of a coupling portion of the disk cartridge shown in FIG. 14.

As shown in FIG. 15, the cutout 3f are deeper than the bevels 2j and 3j. In the square-C shape cutout 3f, side grooves 3h and a center groove 3i are formed on each faces of the upper case half 3 and the lower case half 2. Adjoining the grooves 3h and 3i, a deeper groove 3g is formed in the pull-out direction of the inner case 4 on each faces of the upper case half 3 and the lower case half 2.

Figure 16:
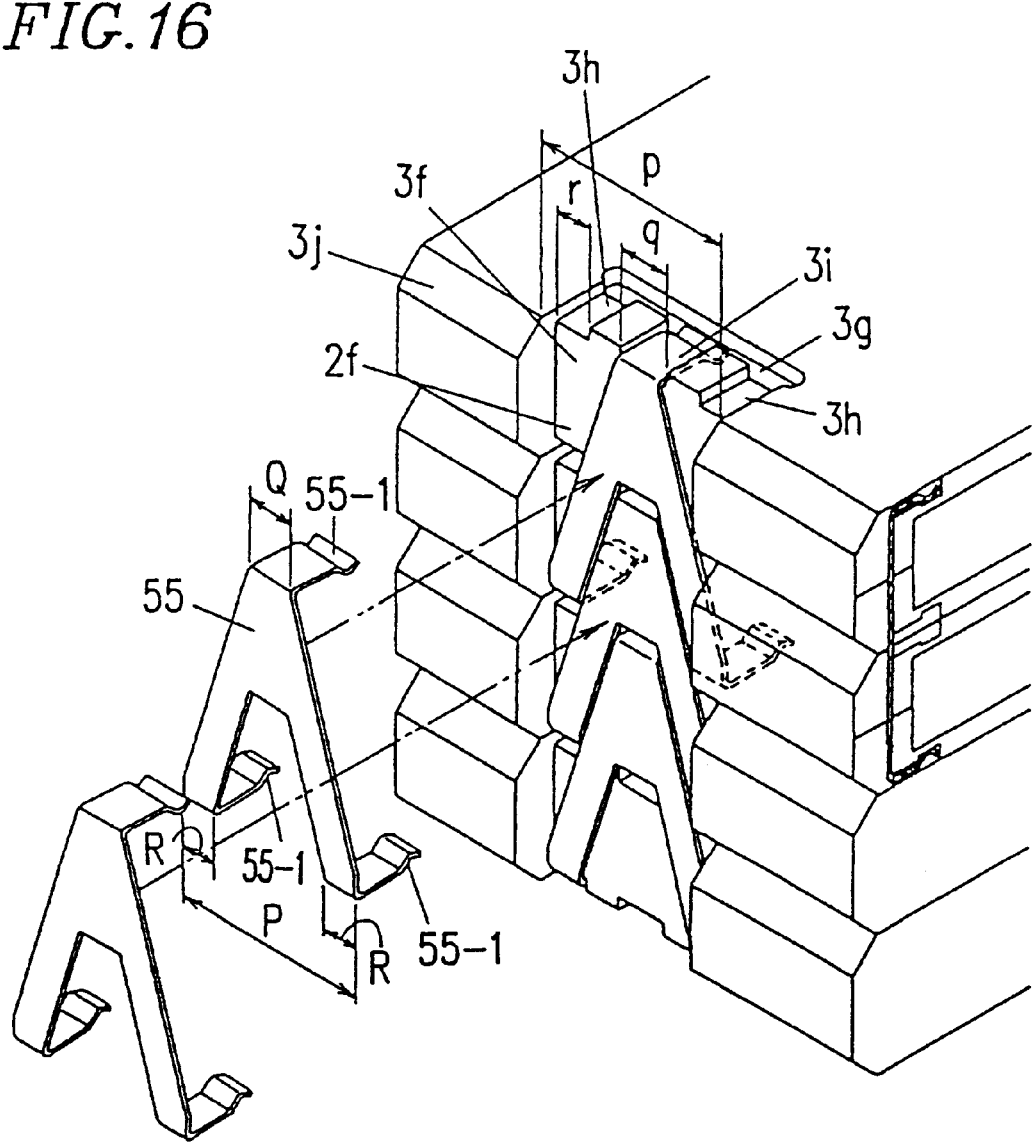
FIG. 16 is a perspective view demonstrating the coupling of a plurality of the disk cartridges and coupling members according to another embodiment.

FIG. 16 shows a plurality of the disk cartridges 110 coupled by coupling members 55. The coupling member 55 is a substantially V-shape leaf spring. An entire width P between open ends of the V-shape leaf spring 55 is slightly narrower than a width p of the square C-shape cutout 3f. A width R of each arm at the open end of the V-shape leaf spring 55 is slightly narrower than a groove width r of the side groove 3h. A width Q of a closing end of the V-shape leaf spring 55 is slightly narrower than a groove width q of the center groove 3i. A length of the V-shape leaf spring 55 in a longitudinal direction (a height of the V-shape) is slightly shorter than a total thickness of the two disk cartridges 110. Each of the open ends and the closing end of the V-shape leaf spring 55 is bent by an angle slightly larger than the right angle. A cross-sectional view of the V-shape leaf spring 55 is a square C-shape. Each tip porion 55-1 of the open ends and the closing end of the V-shape leaf spring 55 is bent to form an R-shape or a V-shape.

As shown in FIG. 16, the V-shape leaf spring 55 is inserted in the square C-shape cutouts 3f of the two adjacent disk cartridges 110. The closing end of the V-shape leaf spring 55 is engaged with the center groove 3i of one of the disk cartridges 110 and the open ends of the V-shape leaf spring 55 are engaged with the side groove 3h of the other of the disk cartridges 110, so that the two disk cartridges 110 are coupled tightly. A third disk cartridge 100 can be coupled by inserting the V-shape leaf spring 55 into using an available center groove 3i of the other disk cartridge 110. A plurality of the disk cartridges 110 are coupled by inserting the V-shape leaf springs 55 sifted by the width of the disk cartridge 110, so as to form a set of the coupled disk cartridges 110.

Figure 17:
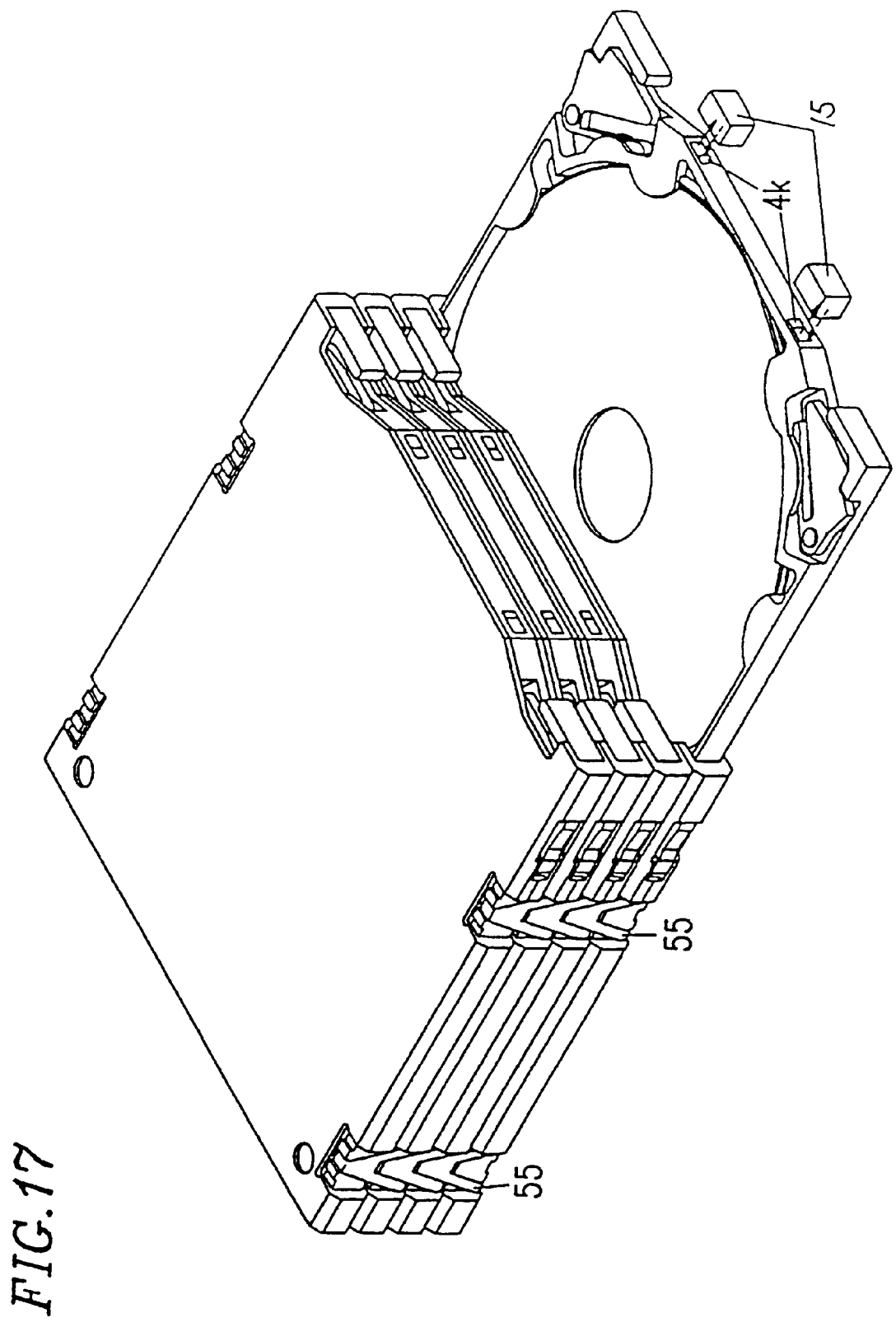
FIG. 17 is a perspective view of the coupled disk cartridges according to another embodiment.

In a cross-sectional view of the coupled disk cartridge 110, a bottom of the C-shape cutout 3f and the surface of the V-shape leaf spring 55 on the side face are placed at a position deeper than a depth of the bevels 2j and 3j. A perspective view of the coupled disk cartridges 110 is shown in FIG. 17.

Next, the secure lock mechanism 71 in the second example will be described. The secure lock mechanism 71 includes a lock mechanism 72 provided in each corner in a pull-out side of the inner case 4 and a release mechanism 73 provided in each side face of the outer case 10 in the vicinity of the opening 14.

There are two ways to release the lock mechanism 72 in the second example. A first method is the same as that of the first example, the release pin 7 being inserted into the U-shape cutout 4c so as to release the lock.

Figure 18:
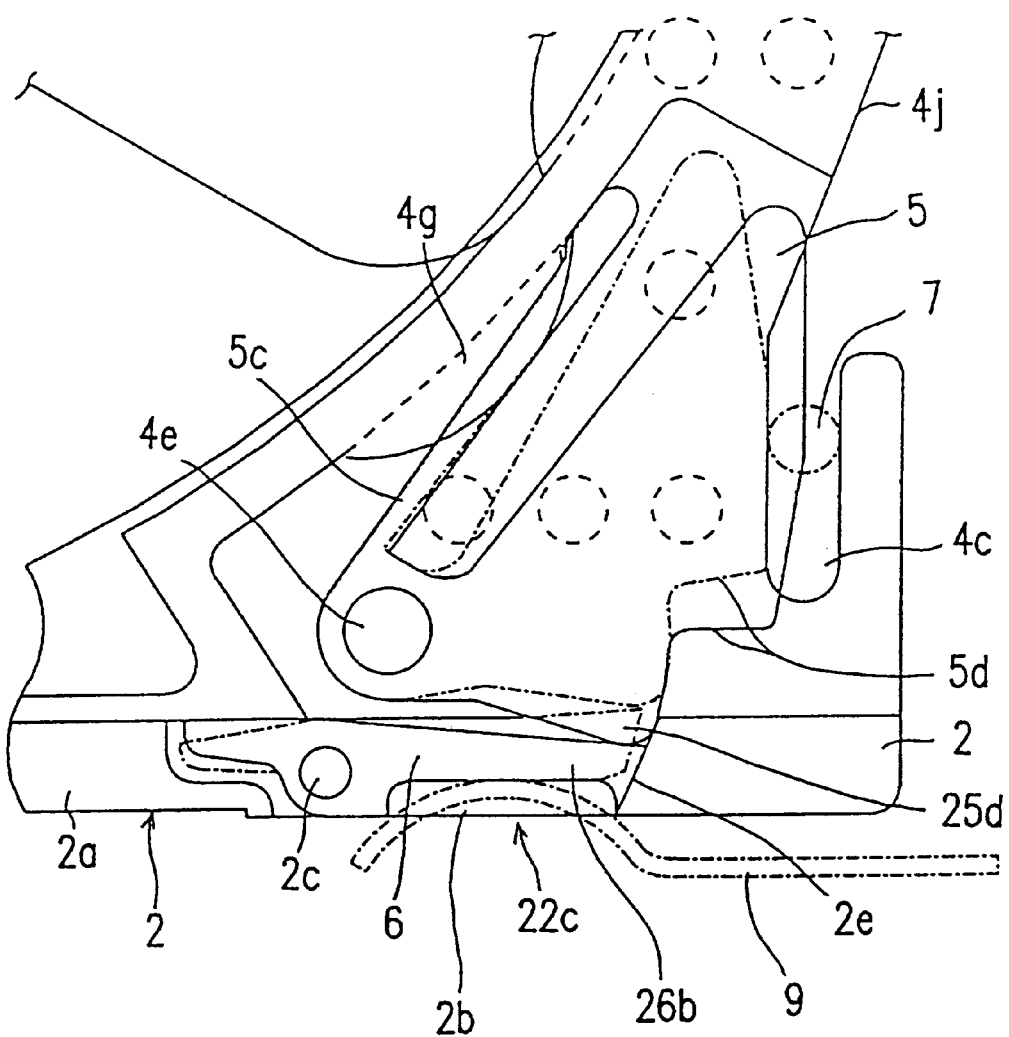
FIG. 18 is an enlarged plan view of a secure lock mechanism of another embodiment of the present invention.

However, the outer case 10 in the second example does not have a groove such as the groove 2j for receiving the guide piece 8, as shown in FIG. 15. In a second method of this example, as shown in FIG. 18, the lock is released by using a release spring 9 instead of the guide piece 8. The structure and operation other than that mentioned above is the same as that of the first example.

EXAMPLE 3

Figure 19:
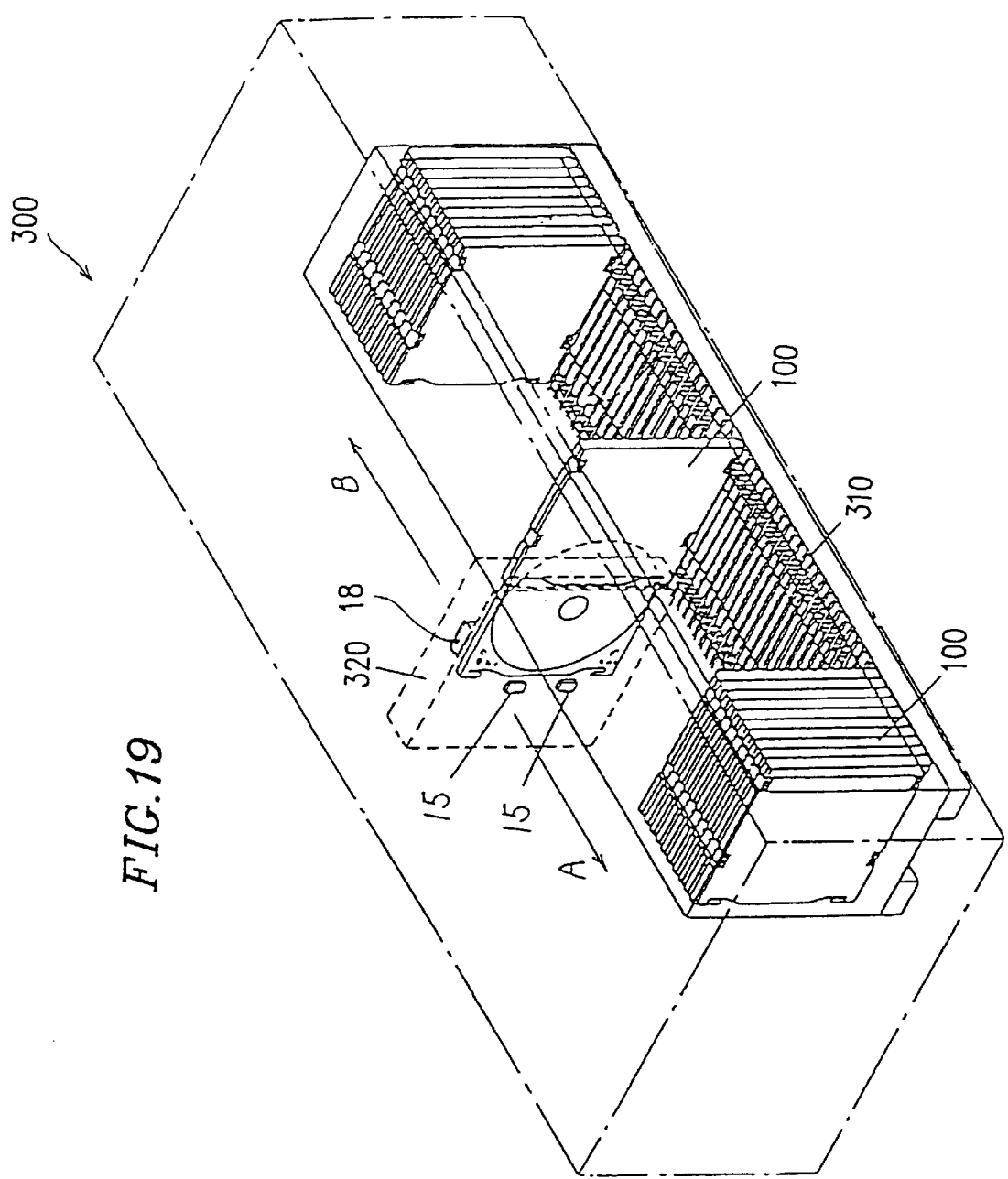
FIG. 19 is a perspective view of a disk changer apparatus according to the present invention.

A disk changer apparatus 300 handling the disk cartridges of the present invention will be described in this example with reference to FIGS. 19 and 20.

Figure 20:
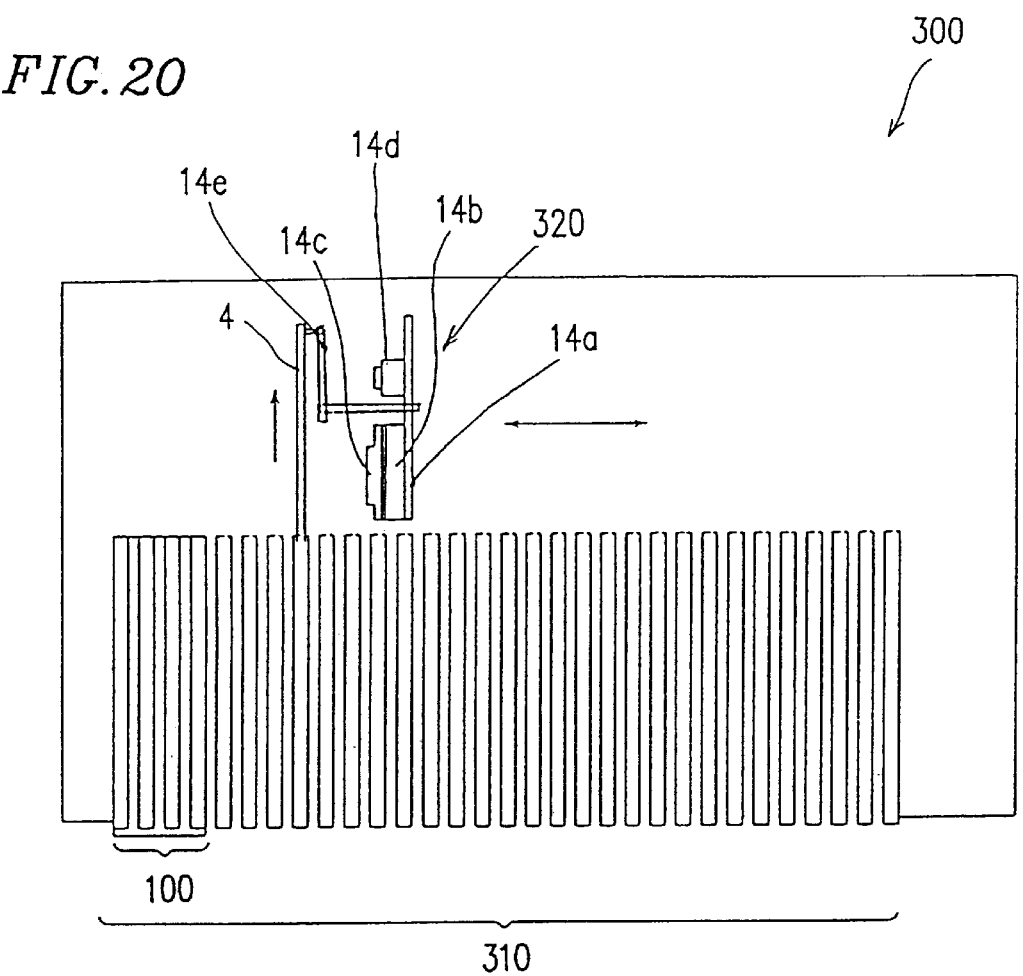
FIG. 20 is a plan view illustrating a disk changer apparatus according to the present invention.

FIG. 20 schematically shows a top plan view of the disk changer apparatus 300. In the following description, the disk changer will be explained by mainly using the disk cartridge 100 of the first example. The disk changer apparatus 300 can handle the disk cartridges of other examples of the present invention in a similar way.

The disk changer apparatus 300 includes a disk stacker 310 for storing the disk cartridges 100 which are aligned in a direction and a disk drive porion (pickup potion) 320. The disk drive potion 320 is provided behind the disk stacker 310 (i.e. on the opposite side of an inserting side of the disk cartridges 100), and is movable along the direction in which the disk cartridges 100 are aligned.

The disk drive portion 320 comprises on a base plate 204 a spindle motor 14b, a turntable 14c fixed on a rotation axis of the spindle motor 14b, an optical pickup 14d including a traverse mechanism, and a pull-out mechanism 14e for pulling out the inner case 4 of the disk cartridge 100, as shown in FIG. 20. The disk drive portion 320, as shown in FIG. 19, comprises a write-protect detection device 15 and an ID detection device 18 for detecting a management information which indicates a type of the optical disk, a region for recording and the like.

The disk stacker 310 has a structure capable of storing single (uncoupled) disk cartridges 100 and coupled disk cartridges 100 as shown in FIG. 12. The disk stacker 310 will be described with reference to FIG. 21 in detail.

Figure 21:
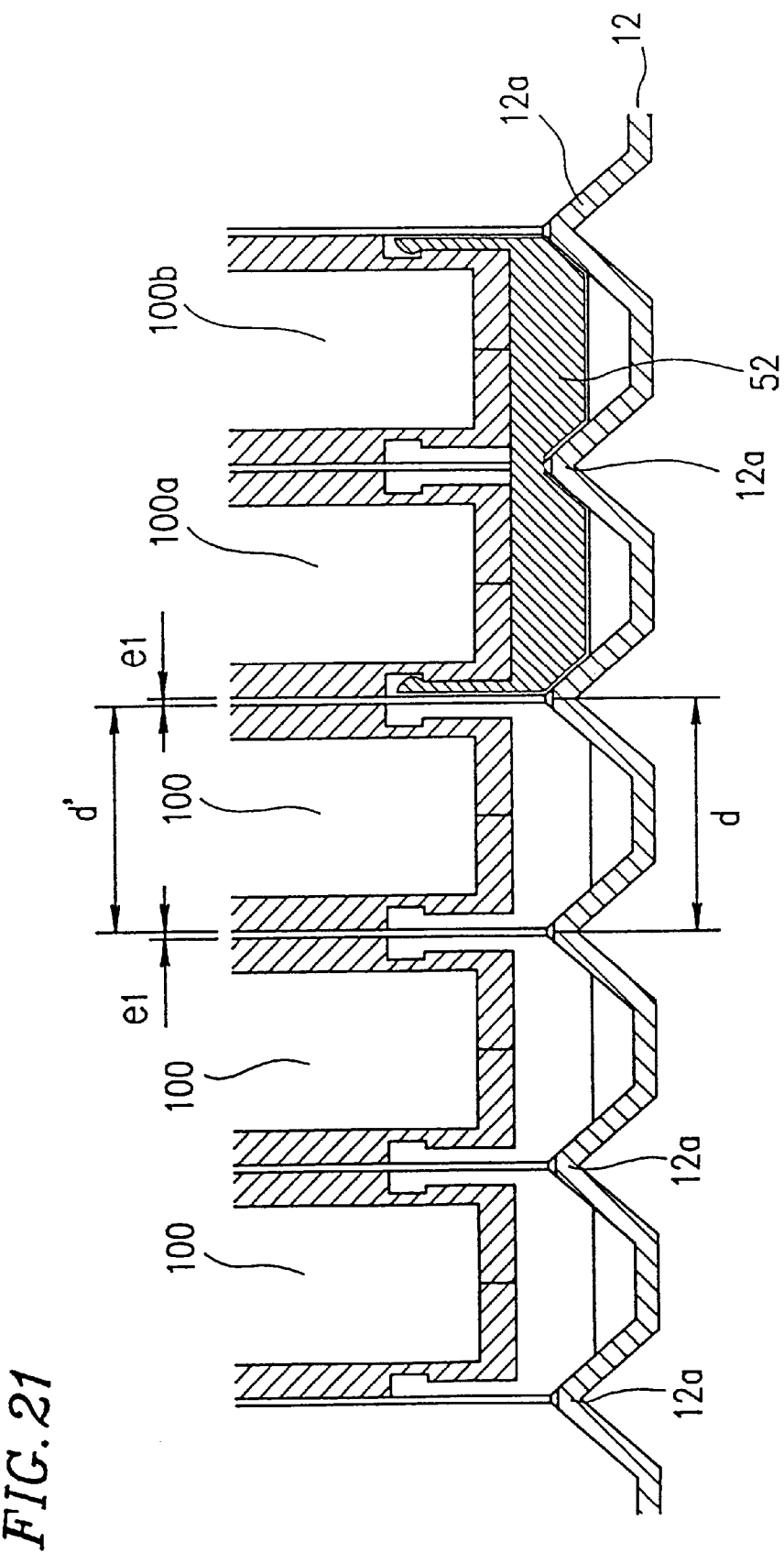
FIG. 21 is a cross-sectional view of a bottom portion of a disk stacker storing the disk cartridges of the present invention.

FIG. 21 shows a cross-sectional view of a bottom portion of the stacker 310. A bottom face 12 of the stacker 310 has a plurality of triangle ridges 12a. An interval of the ridges 12a is d. The width d' of the disk cartridge 100 is slightly smaller than the interval d, so that a small clearance $e_1$ is provided between two adjacent single disk cartridges 100. The clearance $e_1$ is so small that no additional room is required in the disk stacker 310 other than the total thickness of the disk cartridges 100 to be contained. In a case of a set of the coupled disk cartridges 100, the clearance is substantially zero in the set.

In a case of the single disk cartridge 100, each bevel provided on the outer case engages with a corresponding sloping side of the ridge, so that the disk cartridge 100 is holed in an appropriate position. In a case of a set of the disk cartridges 100a and 100b coupled by the coupling member 52, as shown in FIG. 21, a groove-like concave portion is formed by the adjoining bevels. By engaging each of ridges 12a with the groove-like concave portion, the set of the coupled disk cartridges 100 can be holed in the stacker 310 in the same way as the single disk cartridge 100.

Figure 22:
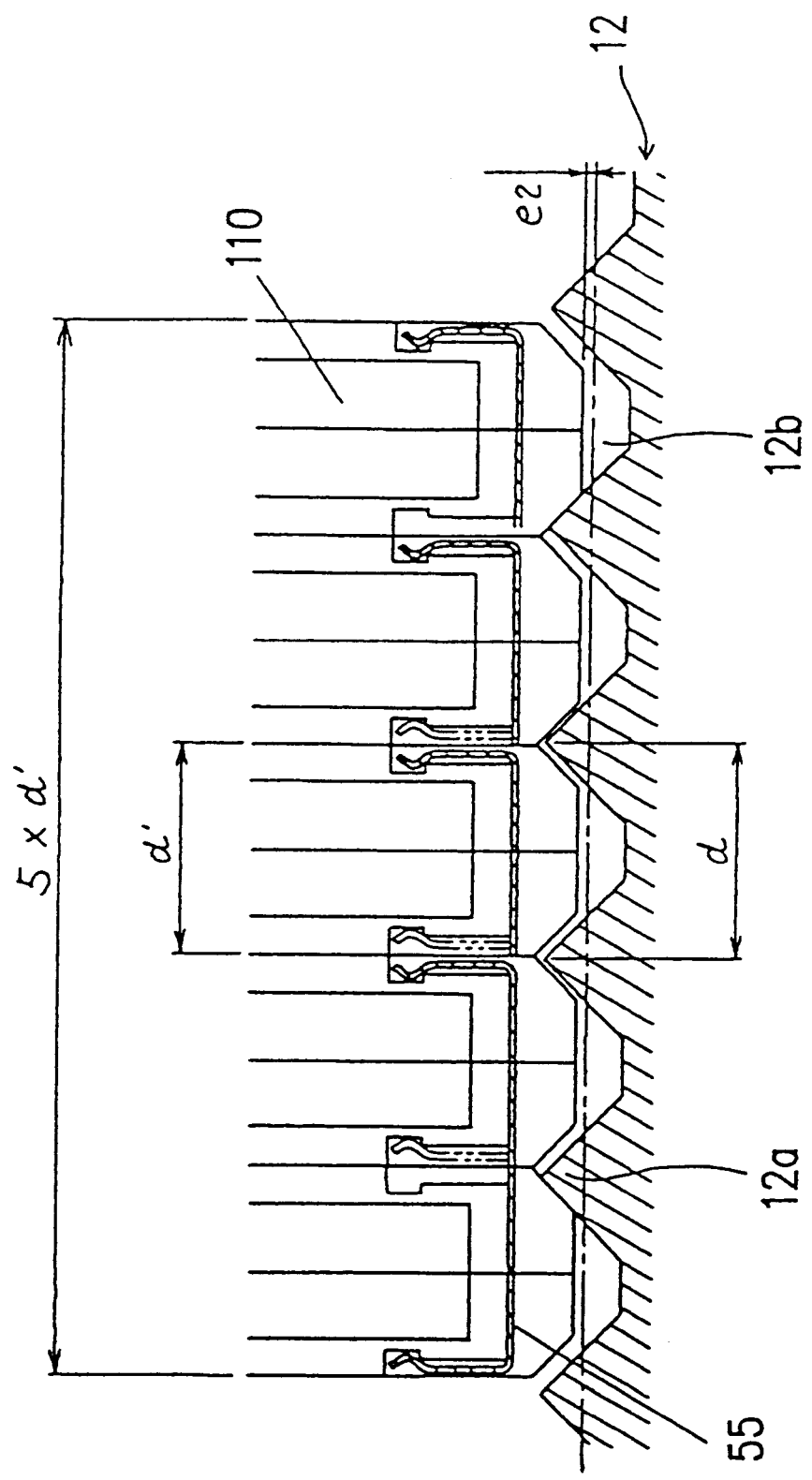
FIG. 22 is a cross-sectional view showing the bottom portion of the disk stacker storing the coupled disk cartridges of the present invention.

FIG. 22 shows a bottom portion of the stacker 310 which contains a set of multiple disk cartridges 110 coupled by the coupling member 55. The following explanation is applicable to the disk cartridge 100.

As shown in FIG. 22, five disk cartridges 110 each having a width d' are coupled into a set. Since a clearance between the adjoining two disk cartridges 110 in the set is substantially zero, the set is shifted upward from a standard position of the single disk cartridge 110 by a longitudinal gap $e_2$. The gap $e_2$ will be estimated in case where each bevel of the disk cartridge 110 has an angle of 45 degrees and each ridge 12a of the stacker 310 has a cross-sectional shape of an isosceles right triangle, as follows. An outer face of the outer disk cartridge 110 of a set is shifted from a standard position which is a position of the uncoupled (single) disk cartridge 110 by a horizontal gap $D_n = e_1(n-1)/2$, where n is a number of the coupled disk cartridges 110 in the set. The horizontal gap $D_n$ is $=e_1(n-1)/2$. The gap $e_2$ is equal to the horizontal gap $D_n$. In a case where the width d' is 3.45 mm and the number n is 5, the clearance $e_1$ is 0.05 mm and the gap $e_2$ is 0.1 mm.

The gap $e_2$ results in an error of an amount $e_2$ in a distance between the disk drive potion 320 and the disk cartridge 110. However, the error $e_2$ will cause no problem if the disk drive portion 230 has an error-compensation structure. For example, the error $e_2$ can be absorbed by providing a taper of at least 0.1 mm to the axis of the turntable 14c which is inserted in a center hole of the optical disk. Therefore, the turntable 14c does not fail to chuck the optical disk.

According to the present invention, there is no difference between handling for a plurality of the disk cartridges coupled into a set and that for a single disk cartridge. A large amount of information stored in a plurality of optical disks can be easily handled by using the present invention. This is advantageous compared with the conventional technique which can not easily handle a plurality of optical disks (or disk cartridges).

Next, operation of the disk changer apparatus 300 will be described retraining to FIGS. 19 and 20. When an optical disk for a read/write operation is indicated, the disk drive portion 320 moves to the disk cartridge 100 housing the indicated optical disk. The moving direction is shown by arrows A and B in FIG. 19. When the disk driving portion 320 comes to an appropriate position, the pull-out mechanism 14e pulls out the inner case 4 holding the optical disk (FIG. 20). While the inner case extends out, the write-protection and the disk management information are detected by the write-protect detection device 15 and the ID detection device 18. Then, the turntable 14c approaches to the optical disk and chucks the optical disk. The optical disk is rotated on the turntable 14c by the spindle motor 14b and the optical pickup 14d closes to the optical disk and reads/writes data. When the read/write operation is finished, the turntable 14c stops rotating, release the chucking, and leaves the optical disk. The inner case 4 extends in and the optical disk is accommodated in the disk cartridge 100

According to the disk changer apparatus 300, a number of the disk cartridges 100 are contained in a small space by closely aligning the disk cartridges 100. The write-protection and the disk management information can be detected during the pulling out the inner case 4. A pull-out region of the inner case 4 is about a half of the inner case 4, so that the depth of the apparatus can be reduced. The disk drive portion (turntable 14c and the optical pickup 14d) are moved to the optical disk and a read/write operation is performed in that position, but the disk cartridge 100 is not transferred to the disk driving device. This makes possible to realize a high changing ratio of the disk cartridges and a miniaturized disk changer apparatus.

The transfer mechanism of the disk drive portion is provided behind the stacker 310. Therefore it is easy to insert the disk cartridges into the stacker 310 without any obstacle in the front side of the disk stacker 310. In addition, back labels of the disk cartridges are easy to be seen by a user, providing convenience in storing and ordering the disk cartridges as books in a bookshelf.

EXAMPLE 4

In this example, a disk changer apparatus 400 will be described. The disk changer apparatus 400 is different from the disk changer apparatus 300 of the third example in the structure of the disk stacker 410. FIG. 23 shows a front view of the disk changer apparatus 400. As shown in FIG. 23, the disk stacker 410 includes triangle ridges 12a on the inner side of a bottom face 12 and projecting leaf springs 16 on the inner side of a top face 13 for holding the disk cartridges. The disk stacker 410 will be described by using the disk cartridges 110 of the second example. However, the following explanation is applicable to the disk cartridge 100.

Figures 24A, 24B, 24C:
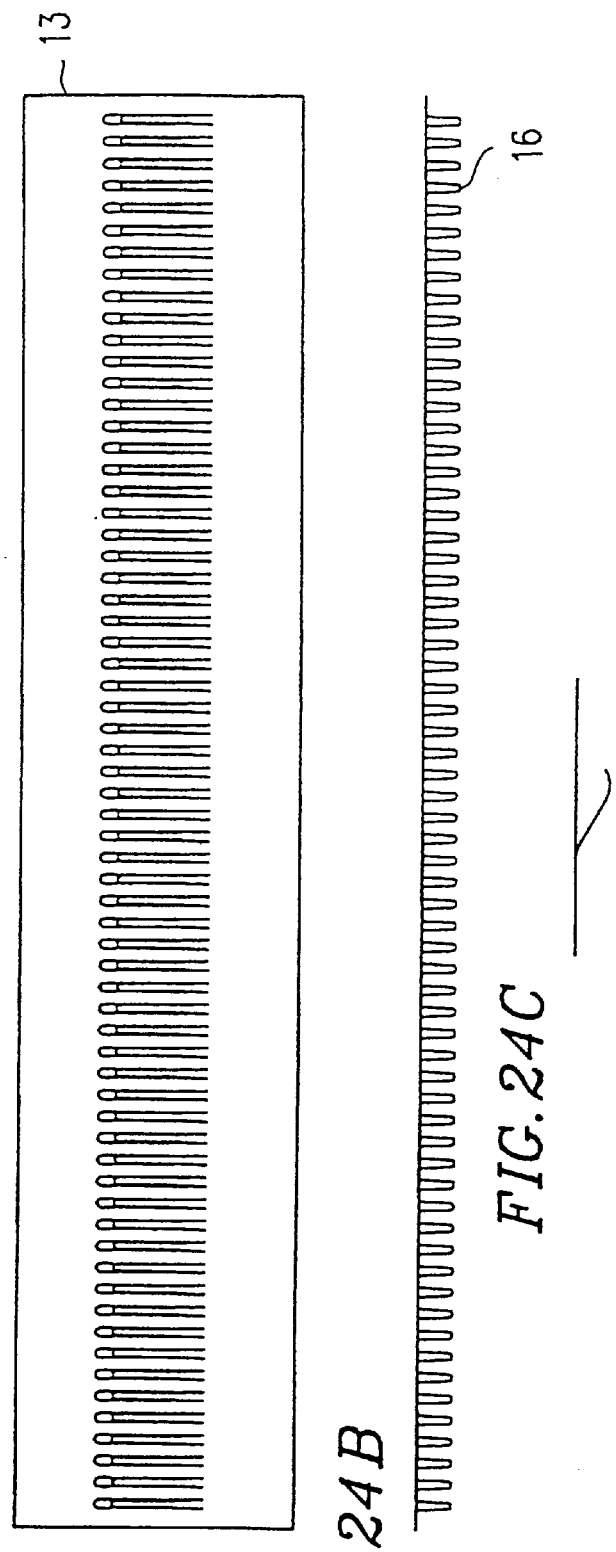
FIG. 24A is a plan view showing an inside of a top portion of a disk stacker according to the present invention.
FIGS. 24B and 24C are side views of the top portion of the disk stacker shown in FIG. 24A.

FIGS. 24A to 24C shows the top face 13 of the disk stacker 410, which is capable of storing a plurality of the disk cartridges 110. An elastic thin plate is used for the top face 13. FIGS. 24A, 24B, and 24c show a plan view of the inner side, a front side view, and a left side view, respectively. The elastic thin plate 13 has a plurality of projecting leaf springs 16 formed by punching or die cutting. As shown in FIG. 24B, a tip of the projecting leaf spring 16 is rounded in a front view. The round portion is engaged with a groove-like concave portion formed by the bevels 2j and 3j of the adjoining disk cartridges 110. The projecting leaf spring 16 may be provided by die forming.

Figure 25:
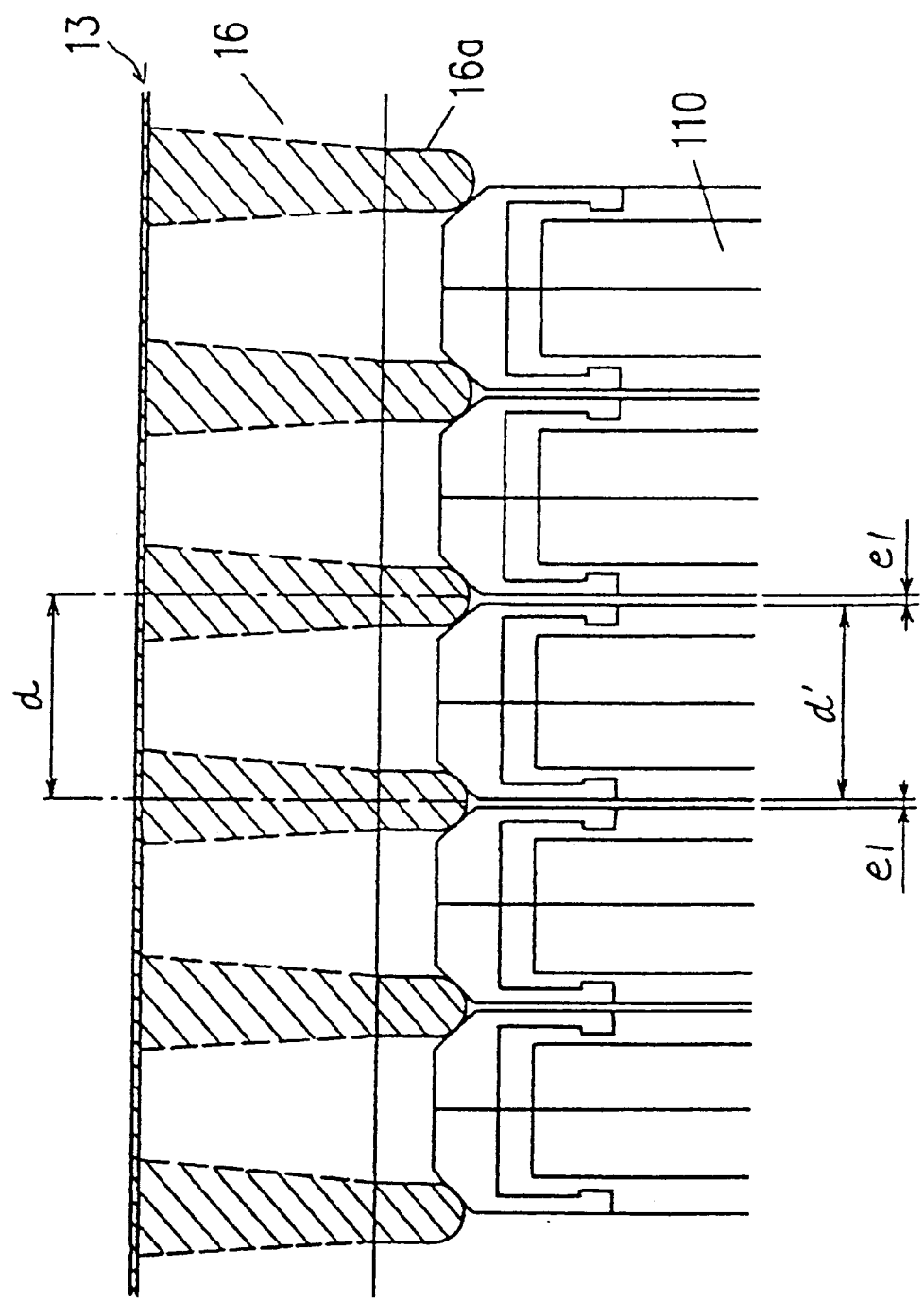
FIG. 25 is a cross-sectional view showing the top portion of the disk stacker storing the disk cartridges of the present invention.

FIG. 25 shows a top portion of the disk stacker 410 holding a plurality of the single (uncoupled) disk cartridges 110. The tip of the projecting leaf spring 16 is rounded in a front view. The round portion 16a of the leaf spring 16 is engaged with the bevels of the disk cartridges 110. An interval d of the leaf spring 16 is equal to a measure of a thickness d' of the disk cartridge 110 plus a clearance $e_1$ in a standard position. Elasticity of the leaf spring 16 can absorb errors in longitudinal and horizontal directions caused by a shift of the disk cartridge 110.

Figure 26:
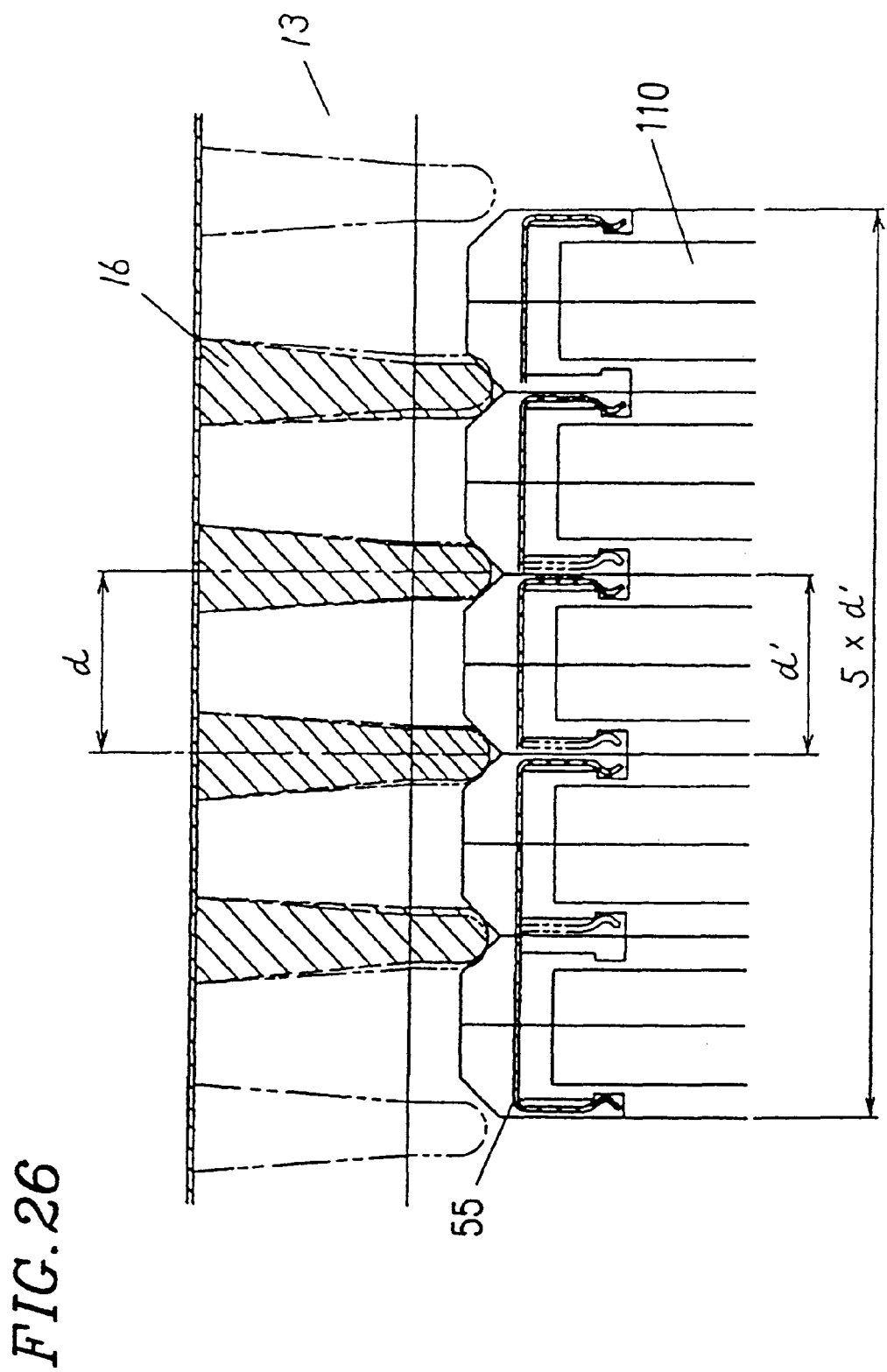
FIG. 26 is a cross-sectional view showing the top portion of the disk stacker storing the coupled disk cartridges of the present invention.

FIG. 26 shows a top portion of the disk stacker 410 holding a set of multiple disk cartridges 110 coupled by the coupling members 55. The standard position of the leaf spring 16 is denoted by a two-dot chain line. In a case of the coupled disk cartridges 110, absence of the clearance $e_1$ causes a shift in a horizontal direction from the standard (uncoupled) position. The elasticity of the leaf spring 16 adapts the round portion 16a to the shift of the disk cartridge 110 so that the round portion 16a fits in the concave portion formed by the bevels, whereby the shift is absorbed.

Figure 27:
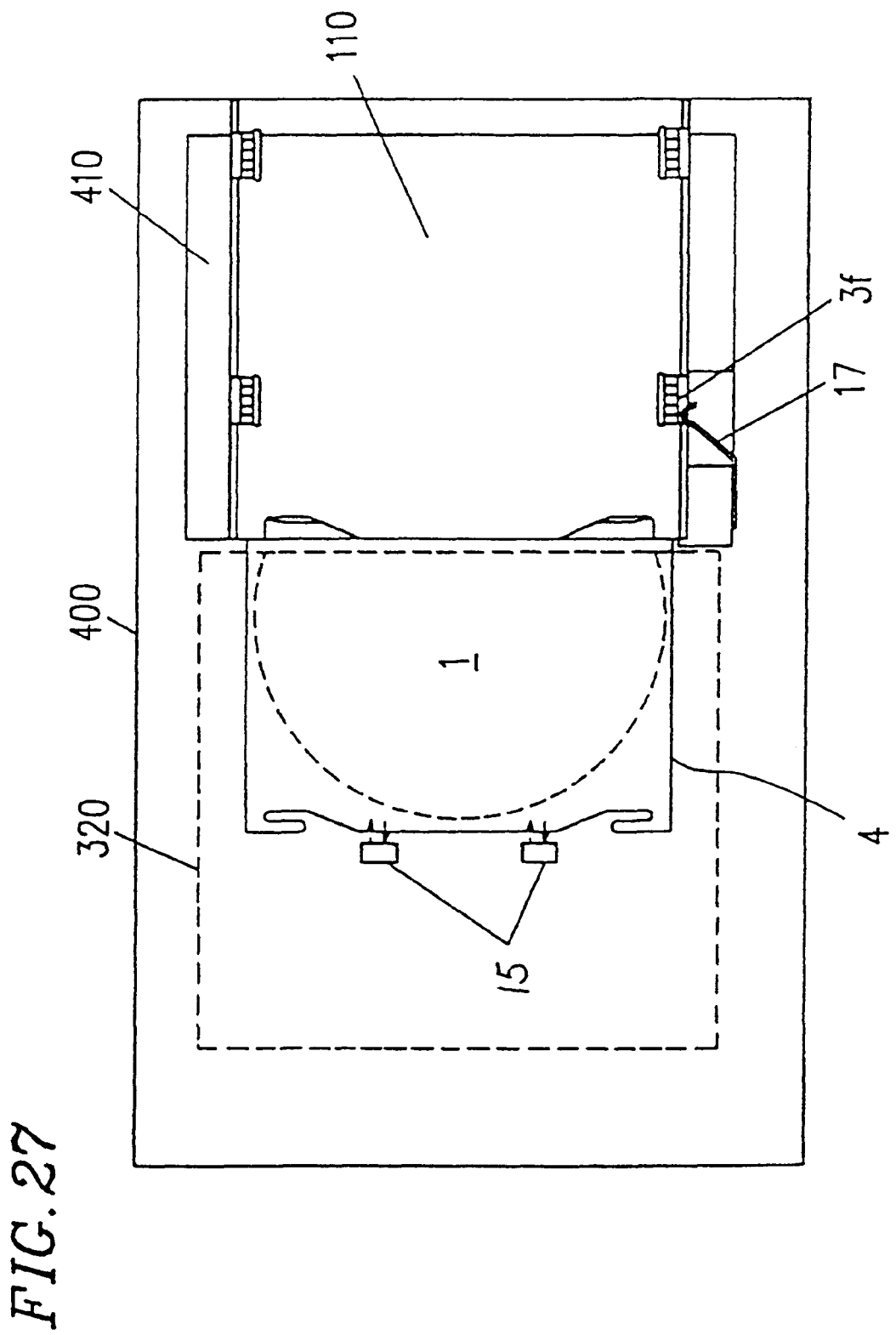
FIG. 27 is a side view of the disk changer apparatus of the present invention.

FIG. 27 shows a side view of the disk changer apparatus 400. As shown in FIG. 27, the disk stacker 410 is provided a leaf spring 17 for each disk cartridge to be hold. The tip of the leaf spring is formed into an R-shape. The leaf spring 17 prevents the disk cartridge 110 form coming out the disk stacker 410. The leaf spring 17 engages with the disk cartridge 110 by using the square C-shape cutout 3f thereof.

When the disk cartridge 110 is inserted into the disk stacker 410 from the right side as shown in FIG. 27, the leaf spring 17 bends downward during a left side portion of the disk cartridge 110 of the square C-shape cutout so as to pass the disk cartridge 110 smoothly. When the disk cartridge 110 is fully inserted in the disk stacker 410, the R-shape tip porion of the leaf spring 17 engages with the square C-shape cutout by the elastic force. The elastic constant of the leaf spring 17 is determined so that the disk cartridge 110 will not come of by a shock caused by vibration of an automobile.

As described above, the disk cartridge 110 can be fixed by using the square C-shape cutout 3f without providing additional mechanism to the disk cartridge 110. In a case where the disk cartridge 100 of the first example is used, the leaf spring 17 can engage with the disk cartridge 100 by using the slot 60 provided on the side face (see FIGS. 2A and 2B).

Figure 28:
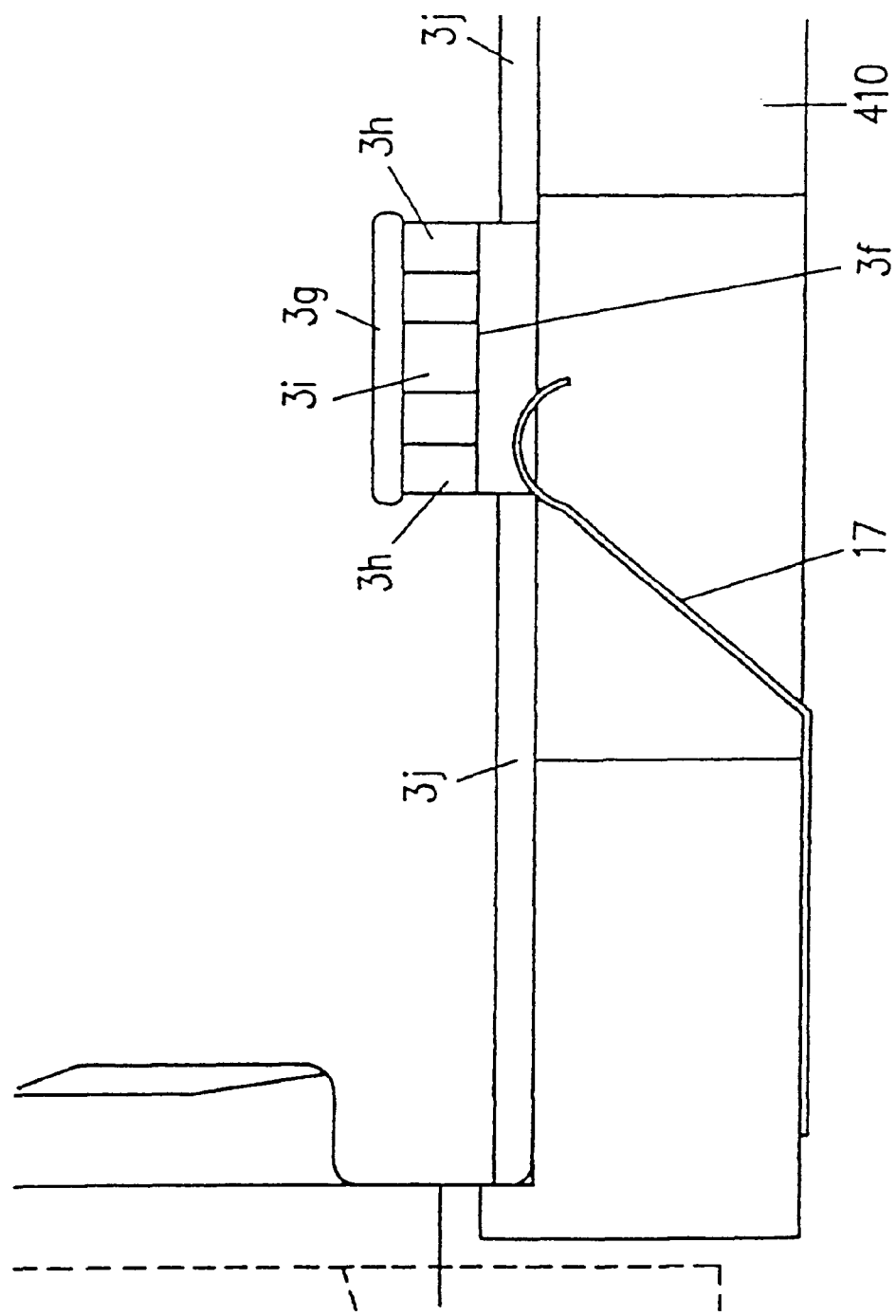
FIG. 28 is a enlarged view showing a mechanism for fixing the disk cartridge to the disk stacker.

FIG. 28 shows how the disk cartridge 110 is fixed to the disk stacker 410 by using the leaf spring 17. As shown in FIG. 28, the R-shape tip of the leaf spring 17 is inserted into the square C-shape cutout 3f so as to prevent the disk cartridge 110 from coming out from the disk stacker 410.

EXAMPLE 5

Figure 29A:
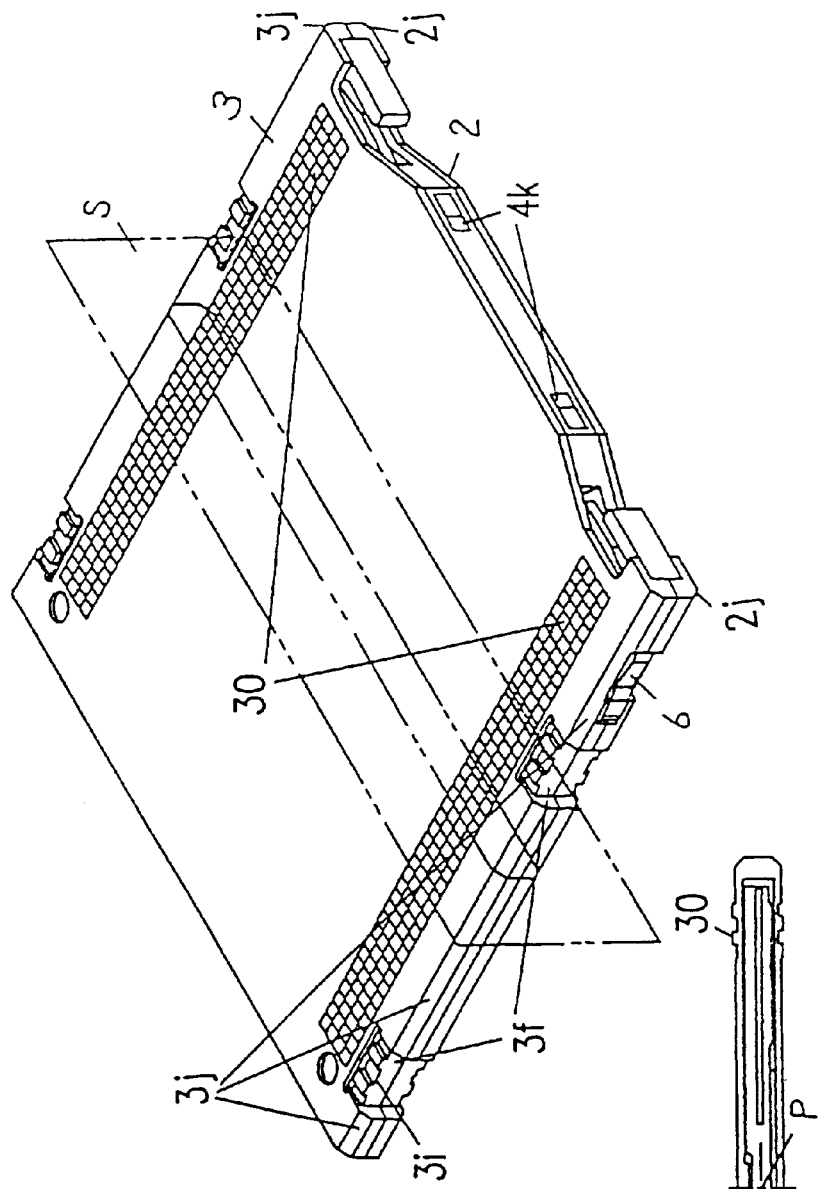
FIGS. 29A and 29B are a perspective view and a cross-sectional view of a disk cartridge having an engaging portion according to the present invention.
Figure 29B:
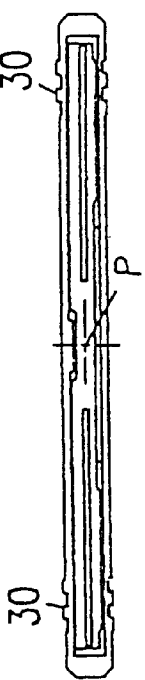

FIG. 29A shows a disk cartridge 120 according to the fifth example of the present invention. FIG. 29B shows a cross-sectional view taken along S plain in FIG. 29A. The inner structure of the disk cartridge 120 is similar to those of the disk cartridges 100 and 110 of the first and second examples. The same portions as those of the disk cartridge 100 or 110 are denoted by the same numerical references.

The disk cartridge 120 is provided with an engaging member 30 on an upper face (an upper case half 3) and a lower face (a lower case half 2) of the outer case 10. The engaging member 30 is capable of engaging an upper face or lower face of another disk cartridge 120.

As shown in FIGS. 29A and 29B, the engaging member 30 includes a region having rectangular concave/convex portions provided on the surface of the outer case 10. The rectangular concave/convex portions of the engaging member 30 has a checkered pattern obstructing in each direction within a plain of the upper face or the lower face of the disk cartridge 120.

Figures 30A, 30B:
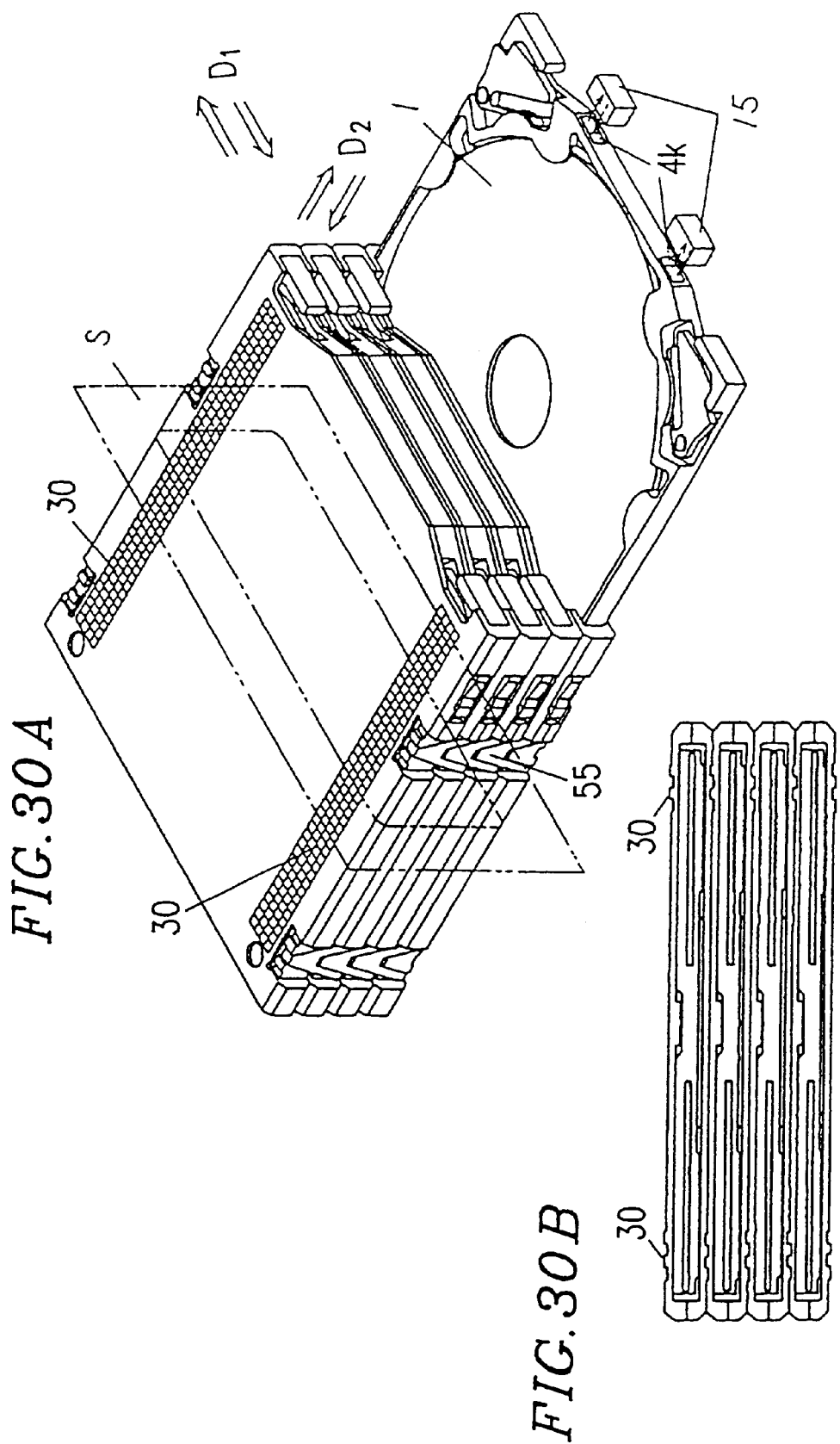
FIGS. 30A and 30B are a perspective view and a cross-sectional view of the coupled disk cartridges shown in FIGS. 29A and 29B.

As shown in FIG. 29B, a distance between the upper face and the lower face of the disk cartridge 120 along the width direction is the same at any point. That is, the concave porion of the upper face is corresponds to the convex portion of the lower face and vice verse. Accordingly, when the disk cartridges 120 are aligned together as shown in FIGS. 30A and 30B, the disk cartridges 120 are engaged with each other by the engaging member 30. Engaging by the engaging member 30 prevent the disk cartridges 120 from sliding in both directions of D1 and D2 shown in FIG. 30B.

The engaging member 30 is in a symmetrical form with respect to a rotation by an angle of 180 degrees around an axis which goes through the center P of the outer case 10 viewed from the pull-out side of the disk cartridge 120. That is, an outward figure of the disk cartridge 120 is unchanged by the 180 degree-rotation (by turning over).

Accordingly, the disk cartridge 120 can be used for an optical disk having both recording sides. For example, in a portable disk drive having a single optical head, the both sides of the optical disk is used for reading/writing by turning over the disk cartridge 120.

The engaging member 30 is divided in two parts on the upper/lower face, so that a large flat area remains on the upper/lower face of the disk cartridge 120. The remaining area can used for attaching a label carrying information such as a title and/or a design. A cutout having a depth for accommodating a thickness of the label may provided on the flat area of the upper/lower face.

In FIG. 30A, the disk cartridges 120 are coupled by using the coupling member 55 of the second example. The disk cartridges 120 may be coupled by using the square C-shape coupling member 52 and the corresponding coupling structure of the first example.

EXAMPLE 6

Figure 31A:
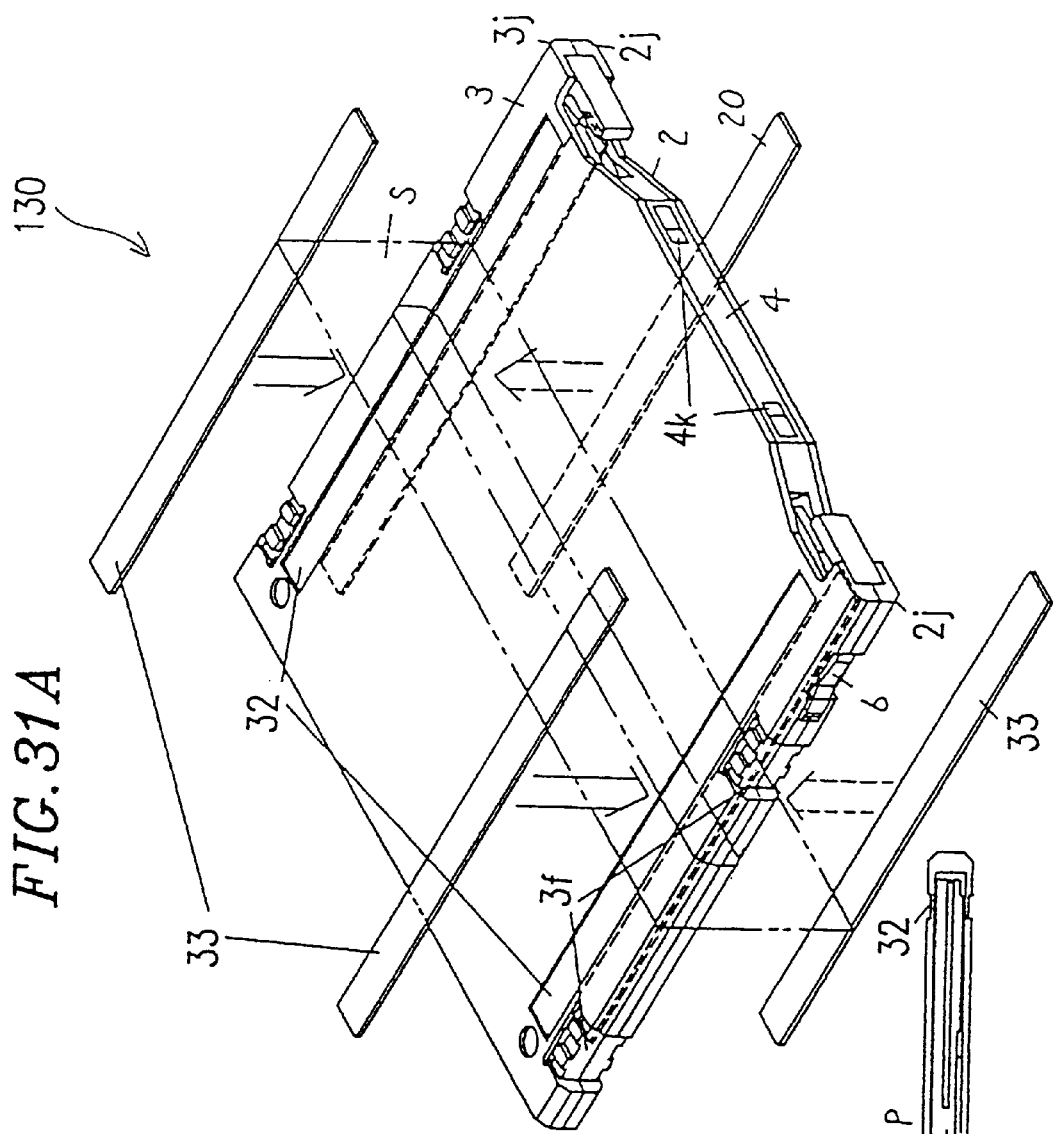
FIGS. 31A and 31B are a perspective view and a cross-sectional view of a disk cartridge having an engaging portion and a plate member for engaging according to the present invention.
Figure 31B:

FIG. 31A shows a disk cartridge 130 according to the sixth example of the present invention. FIG. 31B shows a cross-sectional view taken along S plain in FIG. 31A. The inner structure of the disk cartridge 120 is similar to those of the disk cartridges 100 and 110 of the first and second examples. The same portions as those of the disk cartridge 100 or 110 are denoted by the same numerical references.

The disk cartridge 130 includes a concave portion 32 on an upper face (an upper case half 3) and a lower face (a lower case half 2) of the outer case 10. The concave portion 32 is a rectangular parallelepiped groove formed along the each side having the bevels 2j and 3j. The disk cartridges 130 are coupled by engaging an engaging plate 33 with the both rectangular parallelepiped groove 32 of the adjoining two disk cartridges 130. The engaging plate 33 is formed into a rectangular parallelepiped shape having a same outline as that of rectangular parallelepiped groove 32 and a thickness of twice as large as the depth of the rectangular parallelepiped groove 32. By coupling the disk cartridges 130 by using the engaging plate 33, the disk cartridges 130 are prevented form sliding each other.

Figures 32A, 32B:
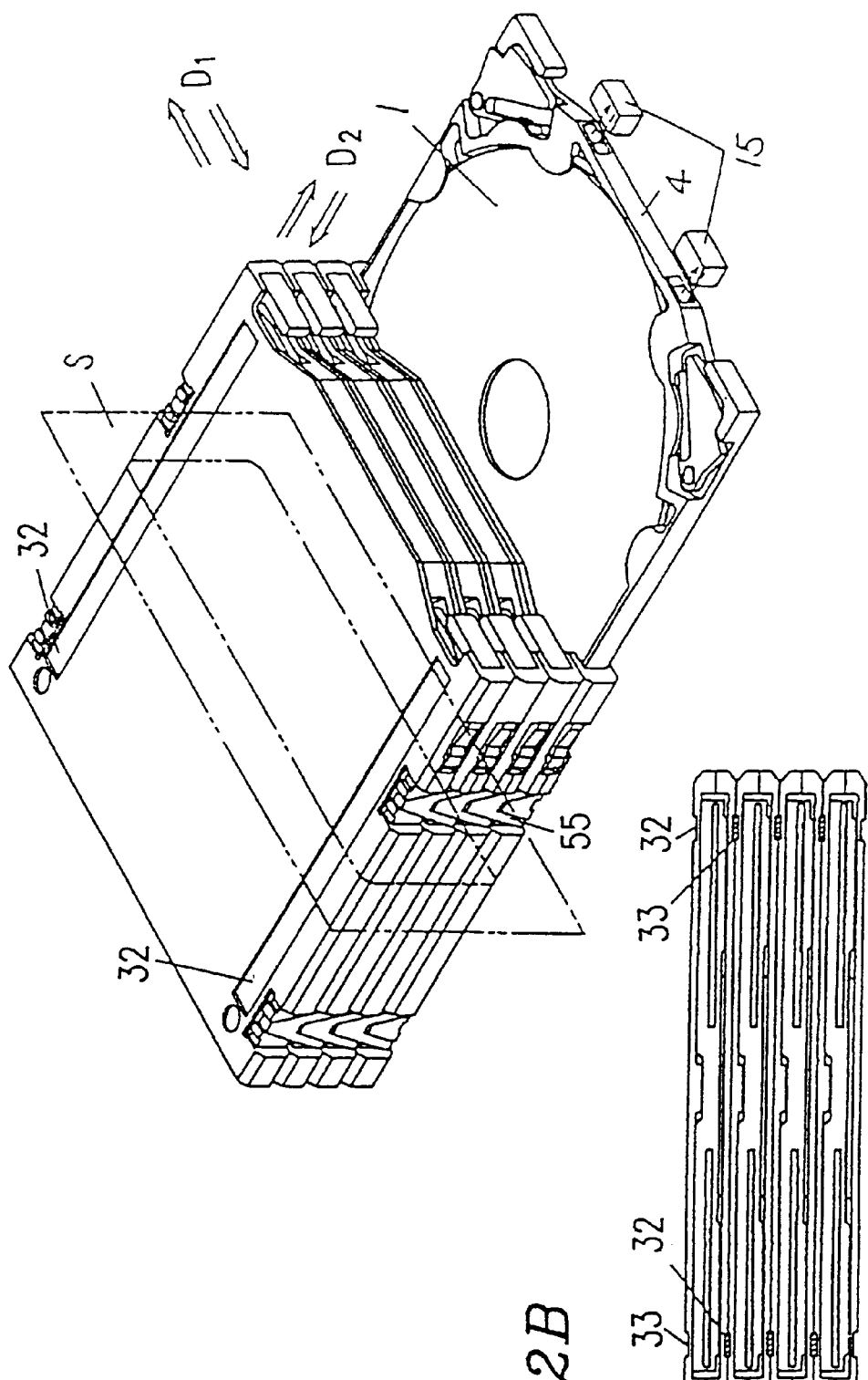
FIGS. 32A and 32B are a perspective view and a cross-sectional view of the coupled disk cartridges shown in FIGS. 31A and 31B.

FIGS. 32A and 32B shows a set of the plurality of the disk cartridges 130 engaged by using the engage plates 33. The disk cartridges 130 are also coupled by the coupling members 55.

As described above, according to the disk cartridges and the disk changer apparatus of the present invention, it is not required to provide an additional room to the disk stacker other than a space accommodating a total width of the disk cartridges to be holed in the disk stacker. Furthermore, a set of a plurality of the disk cartridges coupled together and a single disk cartridge can be handled in a same way in the reduced space of the disk stacker. Shift errors in longitudinal and parallel directions due to coupling the disk cartridges can be easily compensated. Accordingly, a miniaturized disk changer apparatus is provided according the present invention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk cartridge comprising:

an inner case for holding an optical disk;

an outer case for accommodating the inner case, having an opening for allowing the inner case to come in and out;

lock means for locking the inner case inside of the outer case, having a lock mechanism for engaging with the outer case at a locked position and a release mechanism for releasing the lock mechanism at a released position; and coupling means for coupling the disk cartridge with another disk cartridge, wherein the inner case comprises a cutout for inserting a turntable and an optical head in a region being pulled out from the outer case, the lock means comprises a lock cam provided in each corner portion of a pull-out side of the inner case, and a U-shape cutout formed in each corner portion of the inner case, the lock cam comprises a release portion which protrudes into the U-shape cutout in the locked position, and the lock cam release portion is pushed by a release pin which is inserted into the U-shape cutout, whereby the lock cam is moved from the locked position to the released position, and wherein the lock means comprises a release lever which rotates around a lever pivot, the lock cam rotates around a cam pivot, and comprises a projecting portion which protrudes from the inner case in the locked position, and the lock cam proiecting portion is pushed by the release lever, whereby the lock cam is moved from the locked position to the released position.

2. A disk cartridge according to claim 1, wherein the cutout has a sector shape.

3. A disk cartridge according to claim 1, wherein the inner case comprises a member for preventing the lock cam from coming out, and the lock cam comprises a spring portion for returning the lock cam to the locked position and a stopper portion for positioning the lock cam.

4. A disk cartridge according to claim 1, wherein
the outer case comprises a groove in the pull-out direction of the inner case from the opening to the release lever,
the release lever comprises:
  a first portion for pushing the lock cam;
  a second portion for regulating a range of moving of the release lever; and
  a third portion for receiving an external force from a guide piece which is inserted along the groove in the pull-out direction.

5. A disk cartridge according to claim 1,
wherein the outer case is formed into a substantially rectangular box configuration having an upper face, a lower face, and four side faces, the opening being provided in one of the side faces,
the coupling means comprises:
  a pit formed in a vicinity of each corner on the upper face and the lower face of the outer case; and
  at least two grooves formed on the side face of the outer case, for connecting the pit of the upper face and the corresponding pit of the lower face in each corner, and
the pit and the at least two grooves receives a coupling member for engaging with at least two cartridges.

6. A disk cartridge according to claim 5, wherein
the outer case has a bevel along each edge of each side face perpendicular to the side face having the opening, and
a depth of the grooves is shallower than that of the pit on the outer face and the lower face, and is deeper than that of the bevel on the side face including the bevel.

7. A plurality of the disk cartridges according to claim 6, coupled together by using the coupling means so that the openings are aligned in one plane, whereby a concave portion is formed between adjacent disk cartridges by the bevels of the adjacent disk cartridges.

8. A plurality of the disk cartridges according to claim 6, coupled by the coupling member,
  wherein the coupling member is made of an elastic material and formed into a square C-shape, comprising a leaf spring at each end, the leaf spring including a fixing portion at a tip, and
  wherein an outside face of the coupling member is in accordance with a shape of the side face of the outer case including the bevels when the coupling member is inserted in the coupling structure so as to couple the disk cartridges.

9. A disk cartridge according to claim 1, wherein the inner case comprises a plurality of members for preventing the optical disk from coming out, being provided along a peripheral portion of the optical disk in a half side of the inner case which extends out from the outer case.

10. A disk cartridge according to claim 1, wherein the inner case comprises a portion for recording machine readable disk management information in a region being pulled out from the outer case, the machine readable disk management information relating to properties of the optical disk.

11. A disk cartridge according to claim 10, wherein the recording portion comprises a plurality of ID detection holes arranged in a plurality of rows along the pull-out direction of the inner case, and the machine readable disk management information comprises at least one of a type of the optical disk and a region for recording.

12. A disk cartridge according to claim 1, wherein the inner case comprises a write-protect mechanism on a side face corresponding to the opening of the outer case.

13. A disk cartridge comprising:
an inner case for holding an optical disk;
an outer case for accommodating the inner case, having an opening for allowing the inner case to come in and out;
lock means for locking the inner case inside of the outer case, having a lock mechanism for engaging with the outer case at a locked position and a release mechanism for releasing the lock mechanism at a released position; and
coupling means for coupling the disk cartridge with another disk cartridge,
wherein the inner case comprises a cutout for inserting a turntable and an optical head in a region being pulled out from the outer case,
the lock means comprises a lock cam provided in each corner portion of a pull-out side of the inner case,
the outer case is formed into a substantially rectangular box configuration having an upper face, a lower face, and four side faces, the opening being provided in one of the side faces,
the coupling means comprises:
  a pit formed in a vicinity of each corner on the upper face and the lower face of the outer case; and
  at least two grooves formed on the side face of the outer case, for connecting the pit of the upper face and the corresponding pit of the lower face in each corner,
the pit and the at least two grooves receives a coupling member for engaging with at least two cartridges,
the outer case has a bevel along each edge of each side face perpendicular to the side face having the opening, and
a depth of the grooves is shallower than that of the pit on the outer face and the lower face, and is deeper than that of the bevel on the side face including the bevel.

14. A disk cartridge according to claim 13, wherein the cutout has a sector shape.

15. A disk cartridge according to claim 13,
wherein the lock means comprises a U-shape cutout formed in each corner portion of the inner case,
the lock cam comprises a release portion which protrudes into the U-shape cutout in the locked position, and
the lock cam release portion is pushed by a release pin which is inserted into the U-shape cutout, whereby the lock cam is moved from the locked position to the released position.

16. A disk cartridge according to claim 15, wherein
the inner case comprises a member for preventing the lock cam from coming out, and
the lock cam comprises a spring portion for returning the lock cam to the locked position and a stopper portion for positioning the lock cam.

17. A disk cartridge according to claim 15, wherein
the lock means comprises a release lever which rotates around a lever pivot,
the lock cam rotates around a cam pivot having an axis or rotation parallel to the lever pivot, and comprises a projecting portion which protrudes from the inner case in the locked position,
the lock cam projecting portion is pushed by the release lever, whereby the lock cam is moved from the locked position to the released position.

18. A disk cartridge according to claim 17, wherein
the outer case comprises a groove in the pull-out direction of the inner case from the opening to the release lever, the release lever comprises:
- a first portion for pushing the lock cam;
- a second portion for regulating a range of moving of the release lever; and
- a third portion for receiving an external force from a guide piece which is inserted along the groove in the pull-out direction.

19. A plurality of the disk cartridges according to claim 13, coupled together by using the coupling means so that the openings are aligned in one plane, whereby a concave portion is formed between adjacent disk cartridges by the bevels of the adjacent disk cartridges.

20. A plurality of the disk cartridges according to claim 13, coupled by the coupling member,
- wherein the coupling member is made of an elastic material and formed into a square C-shape, comprising a leaf spring at each end, the leaf spring including a fixing portion at a tip, and
- wherein an outside face of the coupling member is in accordance with a shape of the side face of the outer case including the bevels when the coupling member is inserted in the coupling structure so as to couple the disk cartridges.

21. A disk cartridge according to claim 13, wherein the inner case comprises a plurality of members for preventing the optical disk from coming out, being provided along a peripheral portion of the optical disk in a half side of the inner case which extends out from the outer case.

22. A disk cartridge according to claim 13, wherein the inner case comprises a portion for recording machine readable disk management information in a region being pulled out from the outer case, the machine readable disk management information relating to properties of the optical disk.

23. A disk cartridge according to claim 22, wherein the recording portion comprises a plurality of ID detection holes arranged in a plurality of rows along the pull-out direction of the inner case, and the machine readable disk management information comprises at least one of a type of the optical disk and a region for recording.

24. A disk cartridge according to claim 13, wherein the inner case comprises a write-protect mechanism on a side face corresponding to the opening of the outer case.

* * * * *